(12) United States Patent
Harrison, Jr.

(10) Patent No.: US 7,470,244 B2
(45) Date of Patent: Dec. 30, 2008

(54) FLEXION-DISCOURAGING SPLINT SYSTEM, METHOD AND DEVICE

(76) Inventor: Shelton E. Harrison, Jr., 6643 Poplar Pike, Memphis, TN (US) 38119

( * ) Notice: Subject to any disclaimer, the term of this patent is extended or adjusted under 35 U.S.C. 154(b) by 1031 days.

(21) Appl. No.: 10/439,363

(22) Filed: May 16, 2003

(65) Prior Publication Data

US 2003/0209604 A1 Nov. 13, 2003

Related U.S. Application Data

(63) Continuation-in-part of application No. 09/724,701, filed on Nov. 28, 2000, now Pat. No. 6,595,424, which is a continuation of application No. 09/117,150, filed as application No. PCT/US97/01356 on Jan. 22, 1997, now Pat. No. 6,184,804.

(60) Provisional application No. 60/395,367, filed on Jul. 12, 2002, provisional application No. 60/383,526, filed on May 28, 2002, provisional application No. 60/381,624, filed on May 17, 2002, provisional application No. 60/010,648, filed on Jan. 26, 1996.

(51) Int. Cl.
*A61F 5/00* (2006.01)
*A61F 5/37* (2006.01)
*A61B 19/00* (2006.01)

(52) U.S. Cl. .............................. 602/21; 602/5; 602/20; 128/869; 128/878

(58) Field of Classification Search .................... 602/5, 602/20–22, 60–64; 128/869, 878–8, 893–894; 482/47–48, 44; D29/113–114; 2/159, 161.4, 2/161.7, 162, 917–918, 920, 162.2
See application file for complete search history.

(56) References Cited

U.S. PATENT DOCUMENTS

| 956,534 | A | 5/1910 | Lahey |
| 1,160,616 | A | 11/1915 | Jeffery et al. |
| 1,165,970 | A | 12/1915 | Harris |
| 1,173,269 | A | 2/1916 | Heidemann |
| 1,197,652 | A | 9/1916 | Newton |
| 1,325,885 | A | 12/1919 | Weber |
| 1,453,671 | A | 5/1923 | Harrold |
| 1,709,850 | A | 4/1929 | Hodecker |
| 1,906,870 | A | 5/1933 | Palla |
| 2,636,338 | A | 4/1953 | Dinstman |
| 2,728,501 | A | 12/1955 | Hill |
| 2,854,132 | A | 9/1958 | Bjerknes |

(Continued)

OTHER PUBLICATIONS

Sky Mall, "The Only FDA Cleared Device for Motion Sickness." ("Releifband") Sky Mall Catalog. 2003.

(Continued)

*Primary Examiner*—Patricia M Bianco
*Assistant Examiner*—Brandon Jackson

(57) ABSTRACT

Disclosed is a wrist-wearable electronic interface movably mounted on an arm-attachment mechanism. Interface moves from under-sleeve wrist-adjacent position to palm-adjacent position where it can be manipulated by the hand of the arm wearing the device. Alternately adaptable to telephones, audio recorders, remote controls, auto ID equipment, telephone call-blocking, and more. Alternative embodiment provides a wrist-mounted docking station. Another alternative embodiment includes a superior carpal tunnel syndrome therapy device. The system also includes novel battery chargers: (1) window-mounted, solar-powered; (2) mounted in an automobile that also includes an improved odometer, license plate, and cabin air filtration system.

20 Claims, 29 Drawing Sheets

U.S. PATENT DOCUMENTS

| | | | |
|---|---|---|---|
| 3,032,651 A | 5/1962 | Gisiger-Stahli et al. | |
| 3,060,625 A | 10/1962 | Glass | |
| 3,103,660 A | 9/1963 | Ticktin | |
| 3,543,977 A | 12/1970 | Lockridge | |
| 3,700,836 A | 10/1972 | Rackson | |
| 3,928,960 A | 12/1975 | Reese | |
| 3,966,101 A | 6/1976 | Taylor | |
| 3,978,318 A | 8/1976 | Romeo et al. | |
| 4,063,410 A | 12/1977 | Welling | |
| 4,108,340 A | 8/1978 | Conn | |
| 4,136,805 A | 1/1979 | Storms | |
| 4,251,798 A | 2/1981 | Swartz et al. | |
| 4,300,129 A | 11/1981 | Cataldo | |
| D267,129 S * | 12/1982 | Kneisley | D29/113 |
| 4,387,297 A | 6/1983 | Swartz et al. | |
| 4,427,303 A | 1/1984 | Matthias | |
| 4,458,238 A | 7/1984 | Learn | |
| 4,509,667 A | 4/1985 | Meldrum | |
| 4,517,424 A | 5/1985 | Kroczynski | |
| D279,140 S * | 6/1985 | Paulson | D29/113 |
| 4,546,922 A | 10/1985 | Thometz | |
| 4,621,620 A | 11/1986 | Anderson | |
| 4,711,159 A | 12/1987 | Armbruster | |
| 4,722,625 A | 2/1988 | O'Brien | |
| 4,746,043 A | 5/1988 | Booker | |
| 4,766,299 A | 8/1988 | Tierney et al. | |
| D302,075 S | 7/1989 | Burger | |
| 4,847,818 A | 7/1989 | Olsen | |
| 4,864,658 A | 9/1989 | Russell | |
| 4,905,001 A | 2/1990 | Penner | |
| 4,941,460 A | 7/1990 | Working | |
| 4,984,760 A | 1/1991 | Cohn et al. | |
| 4,985,878 A | 1/1991 | Yamada et al. | |
| 5,064,109 A | 11/1991 | Caster | |
| 5,171,976 A | 12/1992 | Bone | |
| 5,178,477 A | 1/1993 | Gambaro | |
| 5,183,193 A | 2/1993 | Brandell | |
| 5,191,197 A | 3/1993 | Metlitsky et al. | |
| 5,214,623 A | 5/1993 | Seager | |
| 5,224,076 A | 6/1993 | Thorp | |
| 5,239,521 A | 8/1993 | Blonder | |
| 5,250,790 A | 10/1993 | Metlitsky et al. | |
| D340,990 S * | 11/1993 | Kawamura | D24/190 |
| 5,267,181 A | 11/1993 | George | |
| 5,272,324 A | 12/1993 | Blevins | |
| 5,274,613 A | 12/1993 | Seager | |
| D343,059 S | 1/1994 | Daniels | |
| 5,305,181 A | 4/1994 | Schultz | |
| 5,323,195 A | 6/1994 | Phillips | |
| 5,329,106 A | 7/1994 | Hone et al. | |
| 5,379,663 A | 1/1995 | Hara | |
| 5,381,387 A | 1/1995 | Blonder et al. | |
| 5,412,545 A | 5/1995 | Rising | |
| 5,416,730 A | 5/1995 | Lookofsky | |
| 5,426,449 A | 6/1995 | Danziger | |
| 5,466,215 A | 11/1995 | Lair et al. | |
| 5,467,324 A | 11/1995 | Houlihan | |
| 5,468,220 A | 11/1995 | Sucher | |
| 5,481,263 A | 1/1996 | Choi | |
| 5,481,265 A | 1/1996 | Russell | |
| 5,511,702 A | 4/1996 | Yang | |
| 5,513,784 A | 5/1996 | Pretorius | |
| 5,514,052 A | 5/1996 | Charles et al. | |
| 5,514,861 A | 5/1996 | Swartz et al. | |
| 5,579,969 A | 12/1996 | Brandell | |
| 5,625,606 A | 4/1997 | Openiano | |
| 5,634,854 A * | 6/1997 | Albertsson | 473/213 |
| D380,874 S * | 7/1997 | Caswell | D29/113 |
| D381,129 S * | 7/1997 | Lawrence | D29/115 |
| 5,653,680 A | 8/1997 | Cruz | |
| 5,657,201 A | 8/1997 | Kochis | |
| 5,659,611 A | 8/1997 | Saksa | |
| 5,678,206 A | 10/1997 | Ishii | |
| 5,746,707 A | 5/1998 | Eck | |
| 5,749,841 A | 5/1998 | Moore | |
| 5,764,164 A | 6/1998 | Cartabiano | |
| 5,769,804 A | 6/1998 | Harris et al. | |
| 5,796,354 A | 8/1998 | Cartabiano | |
| 5,808,289 A | 9/1998 | Becker | |
| 5,868,692 A | 2/1999 | Michniewicz | |
| 5,960,366 A | 9/1999 | Duwaer | |
| 5,969,327 A | 10/1999 | Metlitsky et al. | |
| 6,035,035 A | 3/2000 | Firooz | |
| 6,036,093 A | 3/2000 | Schultz | |
| 6,078,803 A | 6/2000 | Fernandez Martinez | |
| 6,093,162 A * | 7/2000 | Fairleigh et al. | 602/22 |
| 6,095,994 A * | 8/2000 | Spits | 602/22 |
| 6,106,492 A | 8/2000 | Darcey | |
| 6,146,347 A * | 11/2000 | Porrata | 602/21 |
| 6,155,841 A | 12/2000 | Spanyar | |
| 6,179,751 B1 * | 1/2001 | Clears | 482/48 |
| 6,200,286 B1 | 3/2001 | Zamani | |
| 6,213,969 B1 | 4/2001 | MacMorran et al. | |
| 6,285,757 B1 | 9/2001 | Carroll et al. | |
| 6,293,860 B1 | 9/2001 | Kim | |
| 6,315,748 B1 | 11/2001 | Morgan, Jr. | |
| 6,338,163 B1 * | 1/2002 | Markson | 2/163 |
| 6,383,157 B1 | 5/2002 | Massi et al. | |
| 6,408,072 B1 | 6/2002 | Fernandez-Martinez | |
| 6,429,854 B1 | 8/2002 | McKown | |
| 6,443,921 B1 | 9/2002 | Kaplan | |
| 6,454,681 B1 | 9/2002 | Brassil et al. | |
| 6,464,390 B1 | 10/2002 | Baroche | |
| 6,517,501 B1 | 2/2003 | Slautterback | |
| 6,529,713 B1 | 3/2003 | Seymour | |
| 6,530,893 B1 | 3/2003 | Castelli | |
| 6,540,710 B1 | 4/2003 | Cruz | |
| 6,773,410 B2 | 8/2004 | Vara | |
| 2001/0031937 A1 | 10/2001 | Repice et al. | |
| 2002/0005950 A1 | 1/2002 | Beimers et al. | |
| 2002/0035342 A1 | 3/2002 | Williams | |
| 2002/0066786 A1 | 6/2002 | Saito | |
| 2002/0072696 A1 | 6/2002 | Varn | |
| 2003/0130604 A1 | 7/2003 | Porrata et al. | |
| 2003/0130690 A1 | 7/2003 | Porrata et al. | |
| 2003/0144692 A1 | 7/2003 | Williams | |
| 2003/0214481 A1 | 11/2003 | Xiong | |
| 2004/0049141 A1 | 3/2004 | Slautterback et al. | |
| 2004/0133137 A1 | 7/2004 | Hargis et al. | |

OTHER PUBLICATIONS

Sky Mall, "The World's Most Accurate Digital Watch," ("Casio Wave Captor"), Sky Mall Cat., 2003.
Sky Mall, "The Keychain Camera," Sky Mall Cat., 2003.
Sky Mall, "Magellan Sportrak Color is the Ultimate in Color GPS", Sky Mall Cat., 2003.
Sky Mall, "Record Digital Video, Audio and Still Photos With the Argus DC-3300," Sky Mall Cat., 2003.
Sky Mall, "The Only Two-Way Radio Wristwatch", Sky Mall Cat., 2003.
Sky Mall, "Laser-Sighted Minitemp is Hard to Put Down," Sky Mall Cat., 2003.
Sky Mall, "Spy Now ! With the Minox MX Camera," Sky Mall Cat., 2003.
Sky Mall. "Turn-by-Turn Navigation System for Your Pocket PC . . . "), Sky Mall Cat., 2003.
Sky Mall, "Catch an Idea . . . " ("Myvoice Digital Audio Recorder"), Sky Mall Cat., 2003.
Sky Mall, "Quicklink Superpen" and "Quicktionary II",(2 pages total) Sky Mall Catalog, 2003.
Intermec, "1555 Reader/Interrogator," (1 p.), intermec.com. unknown.

Professional Equipment, "Manometers Product List," PROFESSIONALEQUIPMENT.COM, 2001.
Symbol, "RFID Reader- Sled", symbol.com, (1 p.) 2003.
Fluke Networks, "Onetouch Series II", (1 p.) 2000.
Instruments & Equipment Co. "PDA RFID Adapter . . . ", (2 p.) Instr. & Equip Co. Sparta, NJ, 2003.
Omron, "Omron Launch New Read/Write Module . . . ." (2 p.) Aug. 2002, Omron Corp.
Go Solar Company, "Solar Electric Sizing Sheet," (2 p.) Go Solar Co., unknown.
United Solar Sys. Corp., "Uni-Solar and Independent Energy . . . ." Yahoo Finance, (2 p.) May 20, 2003.
Professional Solar Products, "Rooftrac Photovoltaic (PV) Top-Down . . . ." (2 p) Pro. Solar Prod., 2002.
RFID Journal "Get RFID Readers in a Flash," (2 p.) Apr. 22, 2003, RFID Journal.
Gellerson and Merz, "Enabling Implicit Human Computer Intraction . . . " (2p.)Germany, unknown.
Kofax, "Enhanced Bar Code," Kofaz Image Prod., (10p.) Irvine, CA, unknown.
JDJ Store. "IOGear Phaser Handheld RF Wireless Mouse . . . ." (1p.) Sys-Con Pub. 2002.
Micronair, "Installation Instructions." (1p.), unknown.
Micronair, "Invisible Dangers in the Vehicle." (7 p.), unknown.
Ventifilter, "Introducing the Patented Freshair Filter,"Ventifilter Inc., (2 p.) San Diego,CA 2002.
Unknown,"Ionice Breeze Auto Air Purifier," CATALOGUECITY.CO.UK, (1p) unknown.
Cleanair Team, "The Technologies," (3 p.), unknown.
Xybernaut, "Mobile Assistant V". (4 p.), unknown.
Via-PC, "Product Specifications." VIA-PC.COM, Minnesota, unknown.
Supports USA, "Carpal Tunnel Syndrome Releif Products", Supports USA, Lincoln, NE. 2000 (4 p.).
Four Points Prod., Inc., "Our New Soft Flex Computer Gloves," Four Points Prod., 1998 (1 p.).
Protec, "Protec's Carpalcuff? Wrist Brace", Protec Ortho., Landing, NJ, unknown (2 p.).
Mommens, Johan; "The On-Hand PC-Docking Station," PCOnHand.com, unknown date,(1 page).
Microphotonics, "Handheld Rebound Hardness Tester," Microphotonics.com, Irvine, CA, unknown date, (2 pages).

* cited by examiner

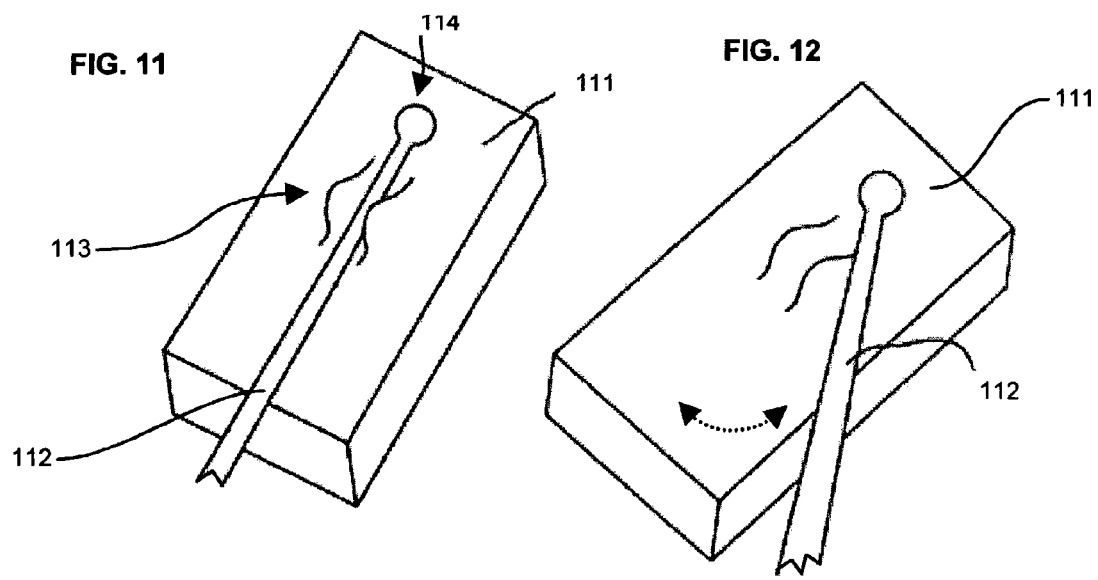
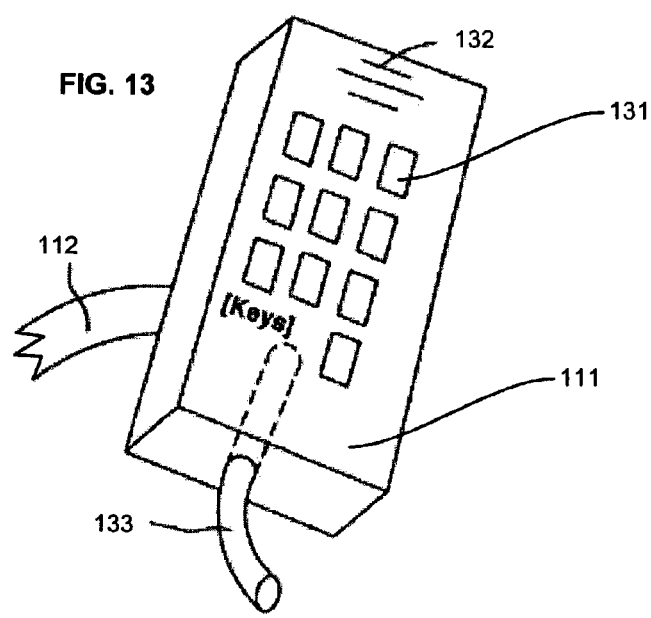

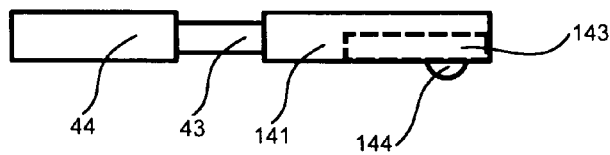
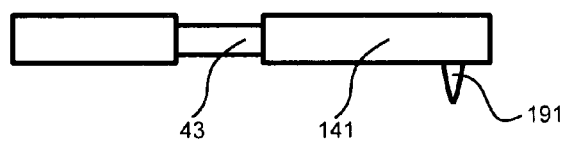
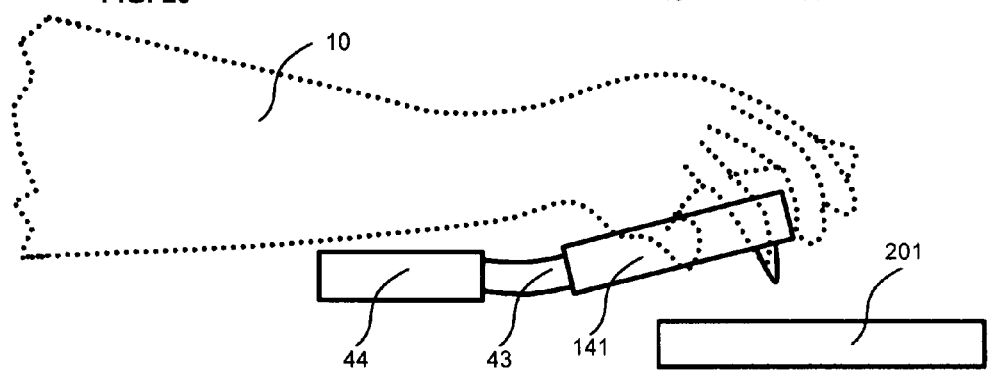
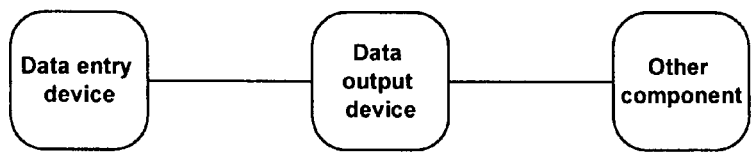

FIG. 38 FIG. 39
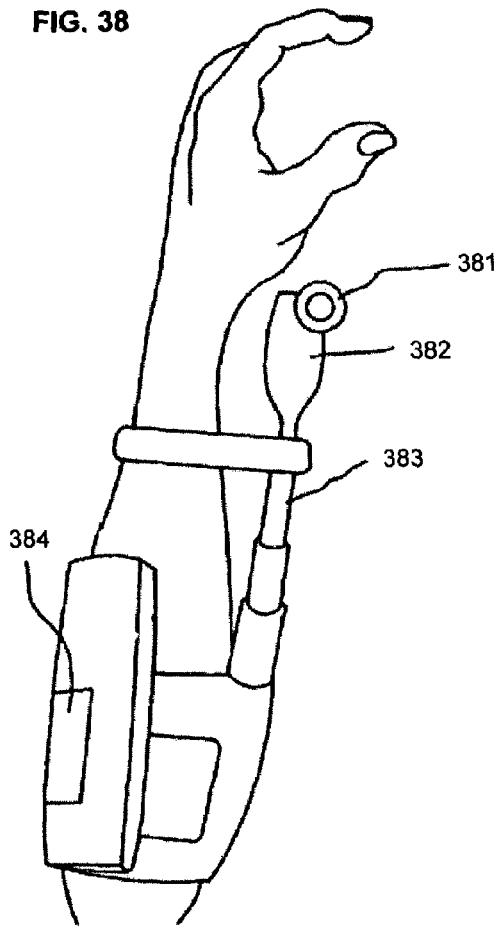
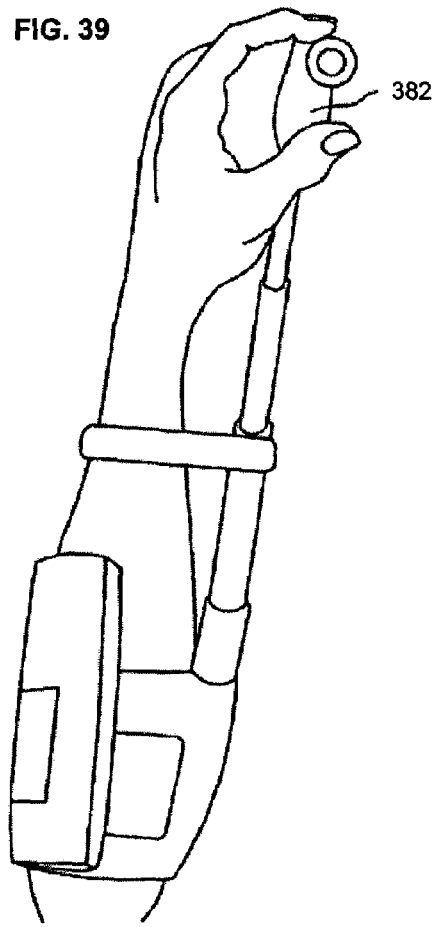
FIG. 40
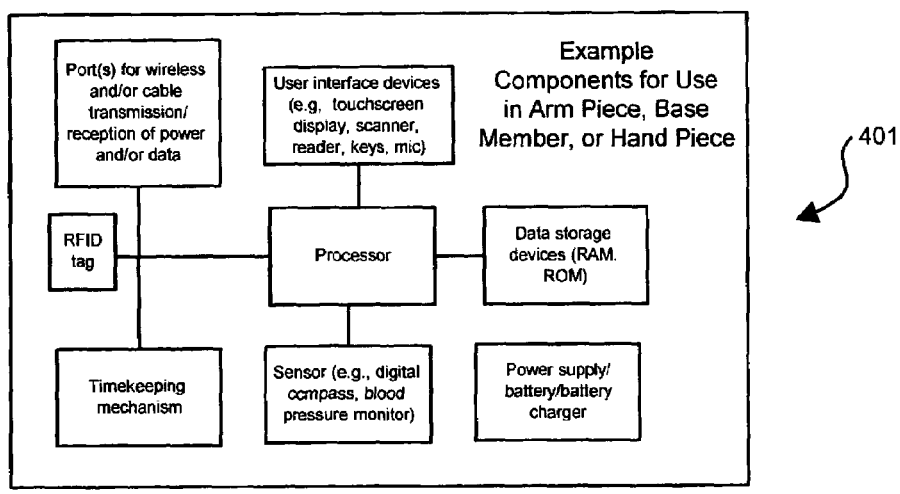

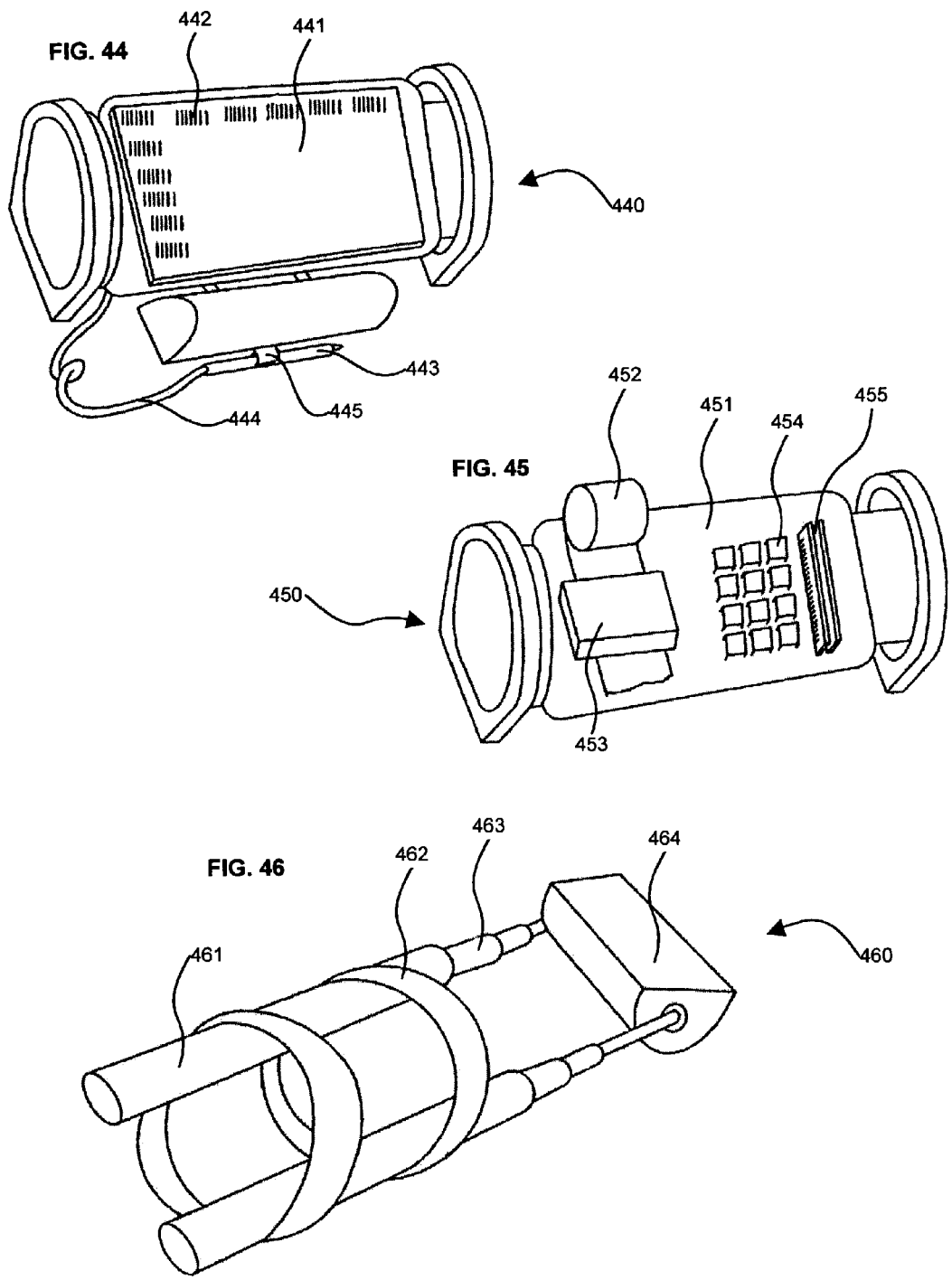

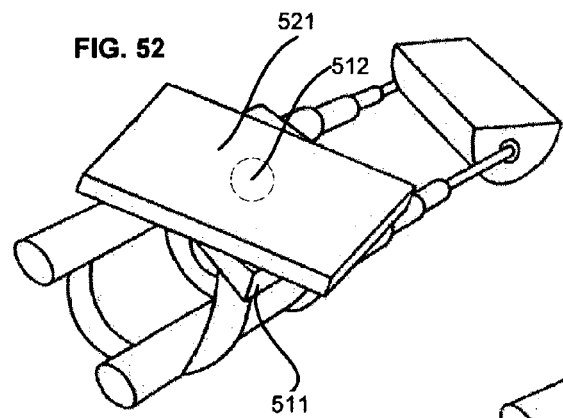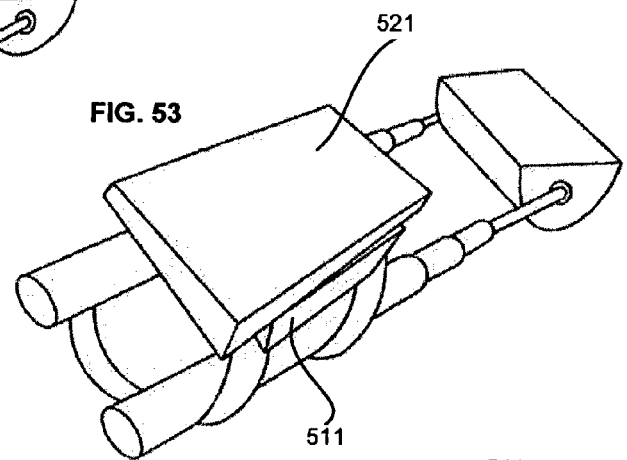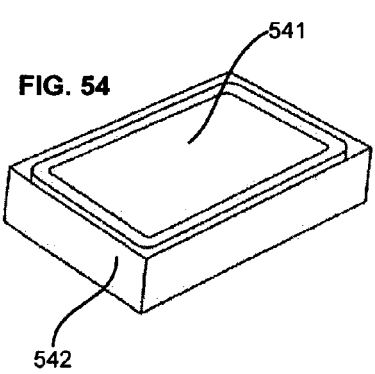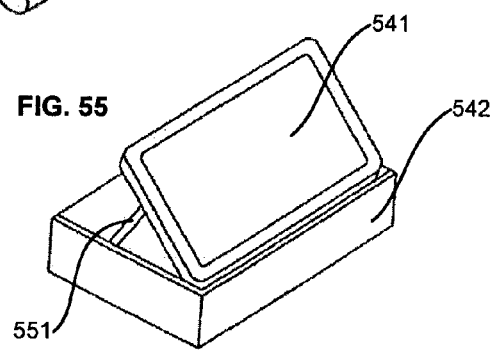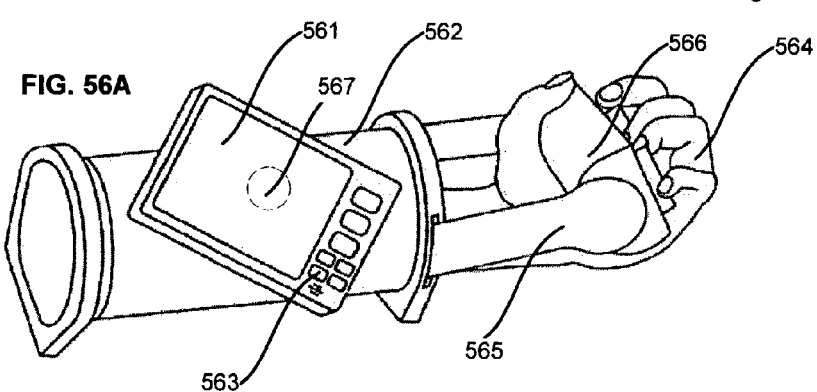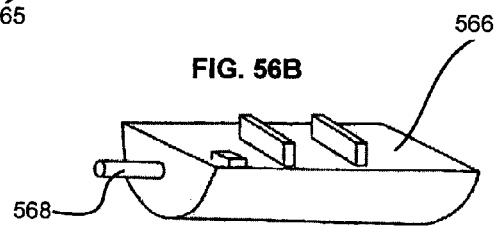

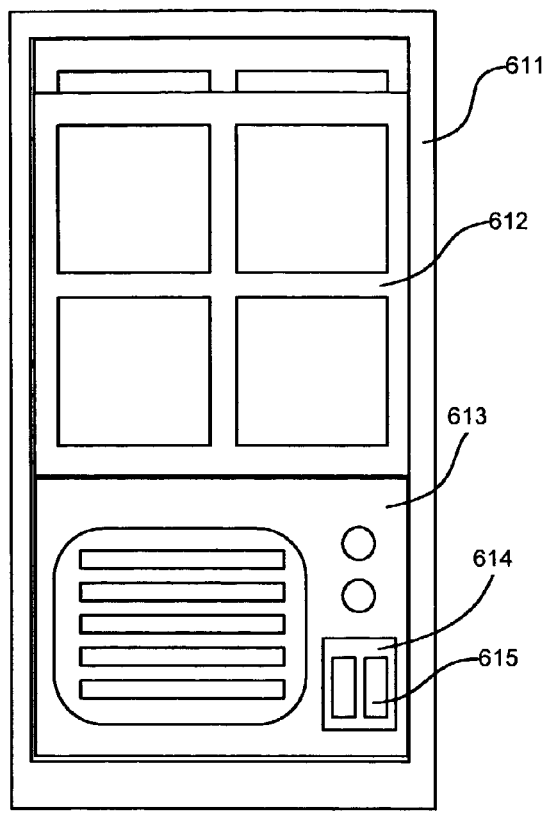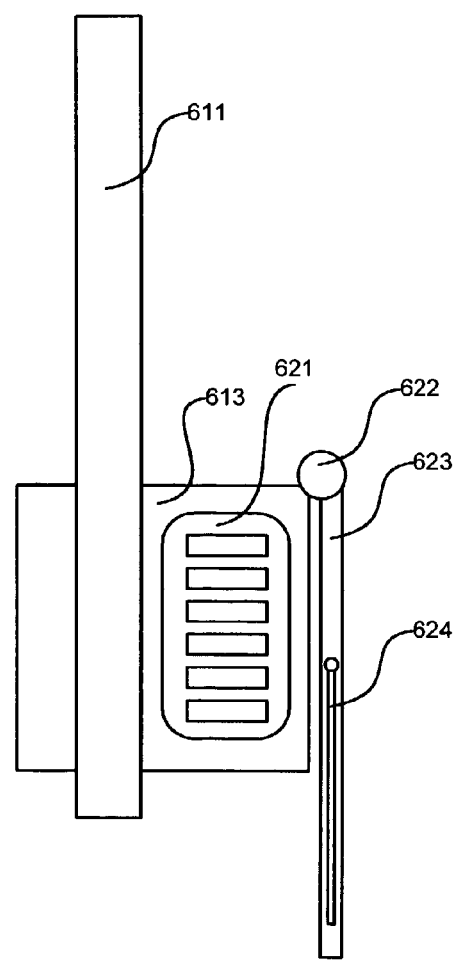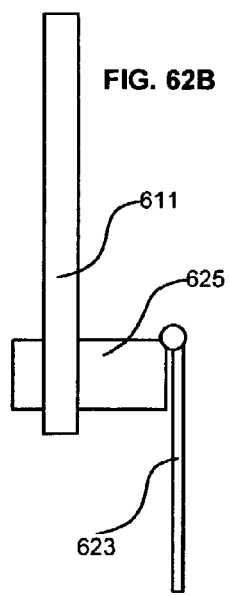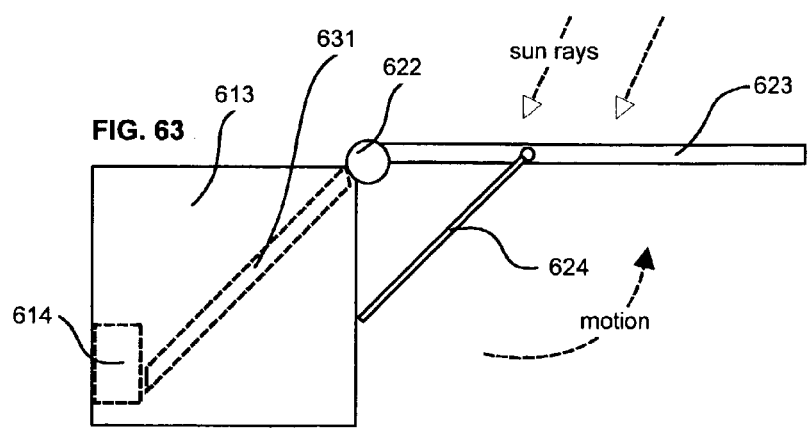

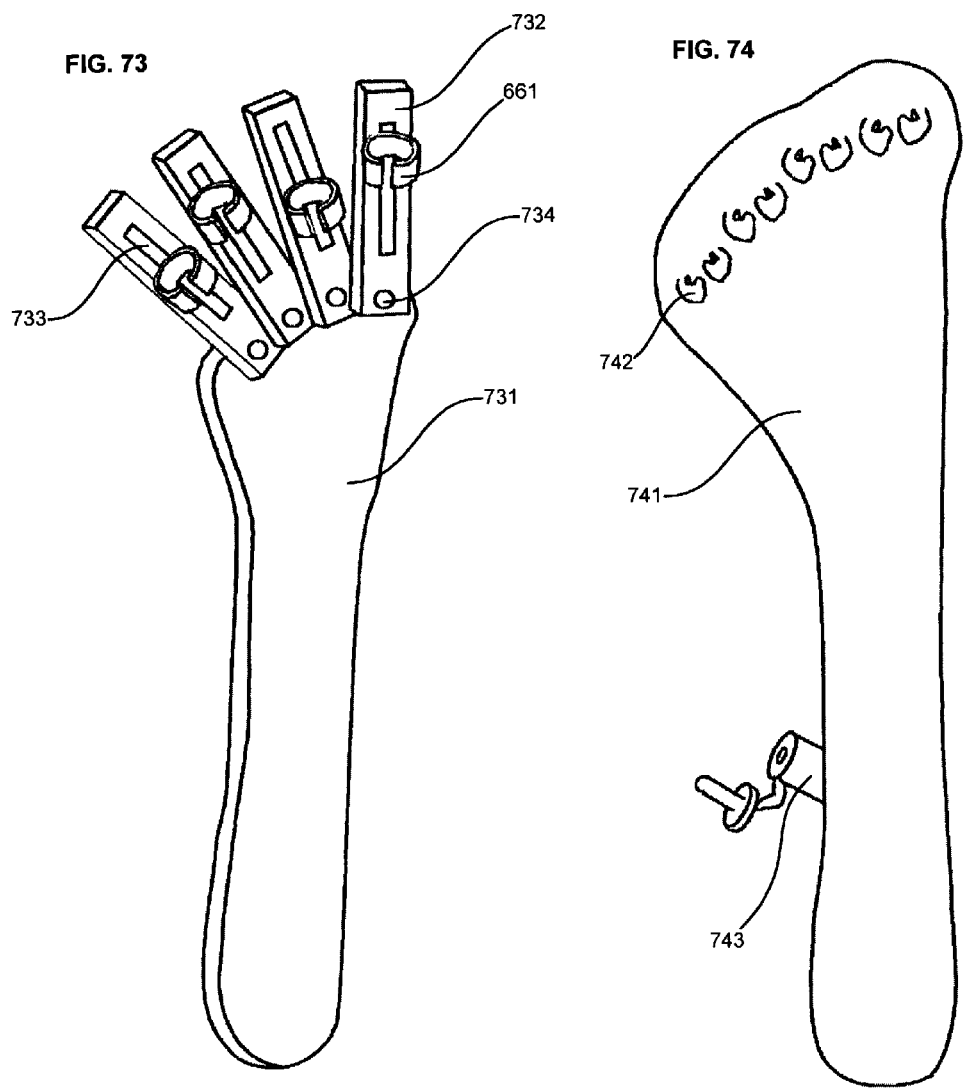

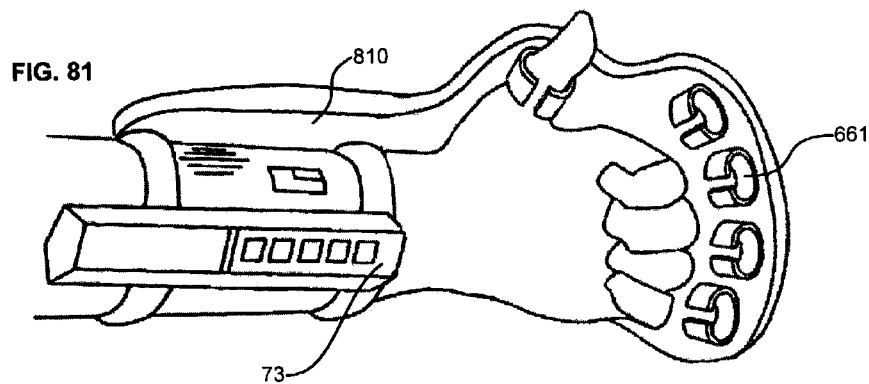
FIG. 81
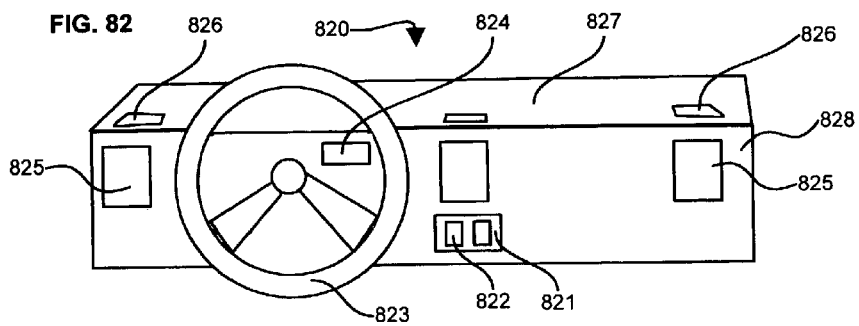
FIG. 82
FIG. 83
EXAMPLE COLOR-TO-NUMBER MATRIX
| COLOR | NUMBER |
|---|---|
| black | → 1 |
| violet | → 2 |
| red | → 3 |
| orange | → 4 |
| yellow | → 5 |
| green | → 6 |
| blue | → 7 |
| purple | → 8 |
| brown | → 9 |
| white | → 0 |
©2002 S. Harrison
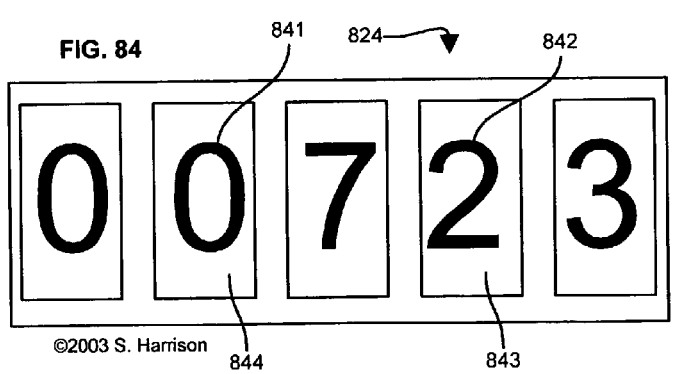
FIG. 84
©2003 S. Harrison
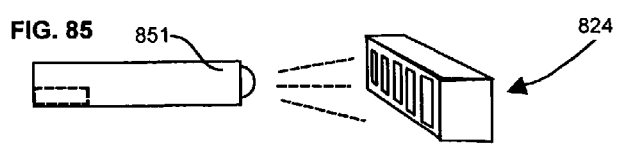
FIG. 85

©2003 S. Harrison cross-sectional view of air duct with vent, filter and dashboard equipped with removable lid for insertion/removal of filter

FLEXION-DISCOURAGING SPLINT SYSTEM, METHOD AND DEVICE

CROSS-REFERENCE TO RELATED APPLICATIONS

This application is a continuation-in-part of U.S. patent application Ser. No. 09/724,701, filing date Nov. 28, 2000 now U.S. Pat. No. 6,595,424, which was a continuation of U.S. patent application Ser. No. 09/117,150, filed Jul. 23, 1998, which has now matured into U.S. Pat. No. 6,184,804. The latter application was the United States national case filing of PCT filing PCT/US97/01356, filing date Jan. 22, 1997, which claimed the priority filing date of provisional patent application No. 60/010,648, filed on Jan. 26, 1996. This application also claims the priority filing date of provisional patent application No. 60/381,624, filed May 17, 2002; provisional patent application No. 60/383,526, filed May 28, 2002; and provisional patent application No. 60/395,367, filed Jul. 12, 2002. All of these related applications are hereby incorporated by reference in their entirety into the present disclosure.

STATEMENT REGARDING FEDERALLY SPONSORED RESEARCH AND DEVELOPMENT

None.

REFERENCE TO SEQUENCE LISTING, A TABLE, OR A COMPUTER PROGRAM LISTING APPENDIX

None.

BACKGROUND OF THE INVENTION

A portion of the disclosure of this patent document contains material which is subject to copyright protection. The copyright owner has no objection to the facsimile reproduction by anyone of the patent documents or patent disclosure, as it appears in the patent trademark office patent file or records, but otherwise reserves all rights whatsoever.

1. Field of the Invention

The present invention relates to wearable electronic systems and devices, physical therapy devices, solar energy collectors, and automobile dashboards.

2. Description of Related Art

The related art descriptions in the above cited related applications are hereby incorporated in full by reference. Briefly summarizing, a number of wrist-wearable electronic devices have been proposed, such as Olsen, U.S. Pat. No. 4,847,818; Russell, U.S. Pat. No. 4,864,658; Swartz, U.S. Pat. No. 5,514,861; Blonder, U.S. Pat. No. 5,381,387; Seager, U.S. Pat. No. 5,214,623; and Houlihan, U.S. Pat. No. 5,467,324. But these devices are not ideal in that they do not provide a convenient manual interface for the hand of the arm upon which the device is worn. Moreover, no wrist-wearable docking mechanism, whereby numerous attachments can be interchanged for wrist-wearable use using the same arm attachment mechanism, is provided, nor is a system of movable couplings that is sufficient to allow swiveling, tilting, revolving, and/or linear movement of entire electronic devices, such as telephones or credit card readers, while being worn on the arm.

One noteworthy effort appears in Moore, U.S. Pat. No. 5,749,841, which provides a wrist brace with built-in keys that can be accessed by the fingers of the arm upon which the brace is worn. However, Moore provides no means for retracting this keypad under the user's sleeve when not in use nor any means for using these keys to control or interact with swiveling, tilting, or otherwise movable, wrist-wearable electronic components.

What is needed, therefore, is a wrist-wearable electronic device for data entry, computing, and other applications which provides a manual interface that can be manipulated by the hand of the arm upon which the unit is worn and can also be retracted into a less obtrusive position when not being used. What is also needed is a device that provides a wrist-wearable foundation upon which components that are larger than a typical wristwatch can be mounted in such a way as rotate, tilt, and/or revolve while in place on a user's forearm. What is also needed is a wrist-wearable docking station that enables a single arm attachment mechanism to be used with a wide variety of interchangeable, electronic attachments or accessories while allowing electrical power and/or data exchange between components in the arm attachment mechanism and the given attachment.

Medical research indicates that carpal tunnel syndrome ("CTS") results from and is aggravated by certain causes, including: (1) physical pressure upon the hand, wrist or forearm, as in the case of resting the wrist on a computer keyboard for extended periods of time; (2) repetitive motion, such as repeated use of the buttons of a computer mouse; (3) pressure exerted upon the carpal tunnel and the nerves of the palm by overdeveloped hand muscles or muscles which are subject to involuntary tension and spasm; (4) trauma to the hand and wrist, as in the case of injuries caused by a car wreck.

Existing devices used to protect or treat the human hand, wrist or forearm often do as much damage as they do good. In particular, the wrist braces most commonly available and often prescribed by doctors and physical therapists for people at risk for CTS or who already suffer from it serve to prevent some harmful motions of the wrist, but the potential gains from eliminating dangerous motions are more than offset by the harm caused by the pressure of the brace itself upon the wrist or palm of the user. Some offerings have avoided this problem, such as Working, U.S. Pat. No. 4,941,460, which provides a splint that makes contact with the back of the hand rather than the carpal tunnel region.

However, Working introduces other problems. Specifically, in gripping the fingers as a group, Working crushes the phalanges and metacarpals together. Moreover, braces that resist the motion of the wrist and fingers have a second unintended, potentially harmful result: in resisting flexing of the wrist and fingers, a brace can serve as a "resistance training" device against which the spasming hand and forearm muscles of a CTS sufferer can push, thereby further aggravating the overdevelopment of these muscles. Other noteworthy CTS-related offerings which are onto the right idea but suffer from this fault include Eck, U.S. Pat. No. 5,746,707, and Spits, U.S. Pat. No. 6,095,994.

Existing solutions also include highly invasive surgeries that cost CTS sufferers a great deal of time, money and pain and which are associated with a high degree of risk of further damage to the patient's hand or wrist.

What is needed is a device that deters motion without applying pressure to the wrist or the bones of the hand, particularly pressure to the carpal tunnel area. What is also needed is a device that deters but does not prevent motion and does not provide resistance to the flexor muscles of the hand and fingers sufficient to allow a user to continue to build up the hand and forearm muscles unintentionally. What is also needed is a solution to CTS that is noninvasive, inexpensive, low-risk, adjustable to fit many different hand sizes, inflatable, and/or reusable.

Solar panels for use on rooftops are commonly known, but inhabitants of multistory apartments and condominium buildings typically do not have access to or control of the roofs of buildings. Many such inhabitants use window-mounted air conditioners, however. What is needed is a solar panel that can be installed in a manner similar to window-mounted air conditioners.

Conventional automobile cabin air purification systems fall into two categories: (1) usage of a single, central filter, such as that of MicronAir; and (2) aftermarket solutions that provide a filter that attaches to each single vent in a car dashboard, such as that provided by FreshAir Filters as per U.S. Pat. No. 6,293,860 to Kim. Neither of these solutions is ideal. The centralized system requires periodic changing of the filter by opening of the hood of the car and changing the filter just as some other engine part. Many automobile owners do not work on their own cars and forget to have the filter changed by someone else. Meanwhile, the aftermarket solution is clearly not as aesthetically pleasing as an OEM solution would be; sticking filters to the dashboard of a car diminishes the intended appearance of that dashboard.

What is needed therefore is an OEM solutions that leverages the benefits of a centralized system of filtration while also allowing automobile owners to change their own cabin air filters from within the passenger cabin rather than from under the hood.

Conventional automobile odometers and license plates are not ideal in that they require the reading of actual numerical digits by an observer or an instrument, such as a camera or scanner. One attempted solution is provided in Bone, U.S. Pat. No. 5,171,976, which provides a bar-code odometer. This device is nonetheless less than ideal in that it is still too complicated to be read at large distances.

What is needed therefore is an improved odometer and license plate that can be read by a human or a machine at far greater distances.

Other technologies related to the system and device disclosed herein include:

The Quicktionary OCR scanning and translating pen; the IOGEAR phaser handheld RF wireless mouse with laser pointer; the wearable RFID tag reader developed by Schmidt, Gellersen, and Merz; the Syscan plug-in RFID reader; Rooftrac roof-mounted photovoltaic solar panel; the One-Touch network tester; AEMC megohmmeter; Panasonic handheld nose hair trimmer; Symbol arm wearable bar-code scanner; Testo handheld digital manometer; MicroPhotonics handheld ultrasonic hardness tester; Goldeneye battery energy gauge; Intermec Sabre 1555 handheld bar-code scanner/RFID interrogator; Archos handheld digital video recorder; Dictaphone personal dictation machine; Voice-It handheld personal digital audio recorder/dictation machine; Xybernaut and ViA wearable computers; and the other cited related art. Many of these devices appear to have been first created and/or made public after the filing date of the parent application hereof and priority filing dates enumerated above.

BRIEF SUMMARY OF THE INVENTION

The disclosed invention provides a mechanism by which a manual interface for an electronic system can be worn under a user's sleeve when not in use and then popped out into his hand when interaction with the device is desired. An alternate docking station mechanism is also provided that is suitable for coupling with any number of attachments such that the same wrist-wearable device can be used to support a wide variety of electronic devices that are typically handheld, now wearable.

Thus, the present invention discloses numerous alternative embodiments, including a wrist-wearable audio recorder/dictation machine, wireless phone, remote control, cursor-positioning/point-and-click device, digital stylus/pen interface, laser pointer, bar-code scanner, hair clipper, microphone, credit card reader, electric screwdriver, drill, toothbrush, camera, and a variety of other devices which can be made as removable attachments to the wrist-wearable docking station.

Also disclosed are a number of alternative arm attachment mechanisms which include rotating, revolving and/or tilting elements, including such elements as a touchscreen monitor, audio I/O devices, printer, keypad, credit card reader, and a bar-code scanner.

Also disclosed is a laptop computer that can be reconfigured with the removal of one element so as to be optimized for wearing.

Also disclosed is a carpal tunnel syndrome (CTS) therapy device that can be integrated with the above wrist-wearable devices.

Also disclosed are novel battery chargers for use in recharging the batteries of the wrist-wearable device. These chargers include a solar-powered, window-mounted battery charger system and an automobile dashboard-mounted battery charger system. The novel automobile dashboard includes additional features for use with the remainder of the disclosed system, such as a color-coded odometer and improved cabin air purification system.

Also disclosed is a telephone system by which unwanted calls made to the wrist-wearable phone may be screened such that unwanted callers are required to pay in order to have their call placed.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 11 through 13 depict perspective views of a handpiece which is a wireless telephone that is mounted upon a connection member by way of a ball-and-socket joint.

FIGS. 18 and 19 depict side views of the handpiece docking station and other parts of the wrist-wearable mechanism in use with two different attachment pieces.

FIG. 20 depicts a side view of the movable components of the wrist-wearable docking station device in use with a PDA.

FIGS. 21 and 22 depict charts of components and mechanisms which may be used in making the arm piece, handpiece, and/or attachment piece under the presently disclosed system.

FIGS. 38 and 39 depict side views of an alternative embodiment that provides a handpiece that is a camera mounted upon a telescoping support mechanism of the arm piece.

FIG. 40 depicts a schematic diagram of electronic components typically used in a handpiece, attachment, and/or arm piece.

FIG. 44 depicts a perspective view of an alternative embodiment that provides an arm-attachment mechanism that includes a pen-like bar-code scanner tethered to the arm piece, a clip for holding this scanner when not in use, and a bar-code sheet holder.

FIG. 45 depicts a perspective view of an alternative embodiment that provides a wrist-wearable POS terminal that includes a credit card reader and a printer.

FIG. 46 depicts a perspective view of certain components of an alternative embodiment that provides an arm attachment mechanism that includes a track to allow a housing to revolve around a user's arm.

FIGS. 52 and 53 depict perspective views of a second housing mounted upon the ball-and-socket joint included in the first housing depicted in FIG. 51A so as to be able to swivel and tilt in place relative to the remainder of the arm-attachment mechanism.

FIGS. 54 and 55 depict perspective views of an alternate housing that provides a display hingedly mounted so as to be able to tilt relative to the housing.

FIG. 56A depicts a perspective view of an alternative embodiment that provides a monitor mounted upon a ball-and-socket joint which is in turn mounted upon an arm-attachment mechanism that is being worn by a user.

FIG. 56B depicts a perspective view of a handpiece used in the above alternative embodiment wherein a peg by which the handpiece is attached to a support mechanism can be seen, such method of attachment allowing the handpiece to rotate relative to the support mechanism.

FIG. 61 depicts an anterior view of a window and a window-mountable solar-powered battery charger for use in charging the batteries of a wrist-wearable device.

FIGS. 62A, 62B and 63 depict side views of alternate embodiments of the window-mountable, solar-powered battery charger.

FIGS. 66 through 81 depict perspective views of alternative arm pieces that include a wrist-wearable carpal tunnel therapy device.

FIG. 82 depicts a perspective view of a dashboard that provides a battery charger for the wrist-wearable device, an odometer that can be scanned or photographed by the wrist-wearable device, and removable/resealable lids through which access to air filters is gained.

FIG. 83 depicts a color-to-number matrix for use in the presently disclosed system.

FIG. 84 depicts an anterior view of an odometer in which the color-to-number matrix is used.

FIG. 85 depicts a perspective view of an attachment piece in use with the odometer.

DETAILED DESCRIPTION OF THE INVENTION

The present invention provides a device, method and system for mounting a user-accessed electronic or mechanical interface or tool on a user's arm. Numerous supporting technologies are also provided, as well as several alternative embodiments and optional features, applications, components, and manners of usage.

Aspects of the invention generally fall into the following categories: (I) arm attachment mechanism (sometimes called "AAM" or "arm piece"); (II) user-accessed device (sometimes mounted upon the arm piece and sometimes upon a "handpiece," which is a component positioned to be accessed by the hand/fingers of the arm upon which the arm piece is worn); (III) means of attaching user-accessed device to arm piece or handpiece; (IV) movable coupling between a user-accessed device and the arm piece; (V) removable attachment configured to fit in a wrist-wearable docking station; (VI) wrist-wearable docking station; (VII) battery charger; (VIII) process in which the user-accessed device is used; (IX) therapeutic features of the arm piece; and (X) external devices which, through interaction with the user-accessed device, form a larger system.

Figure 1:
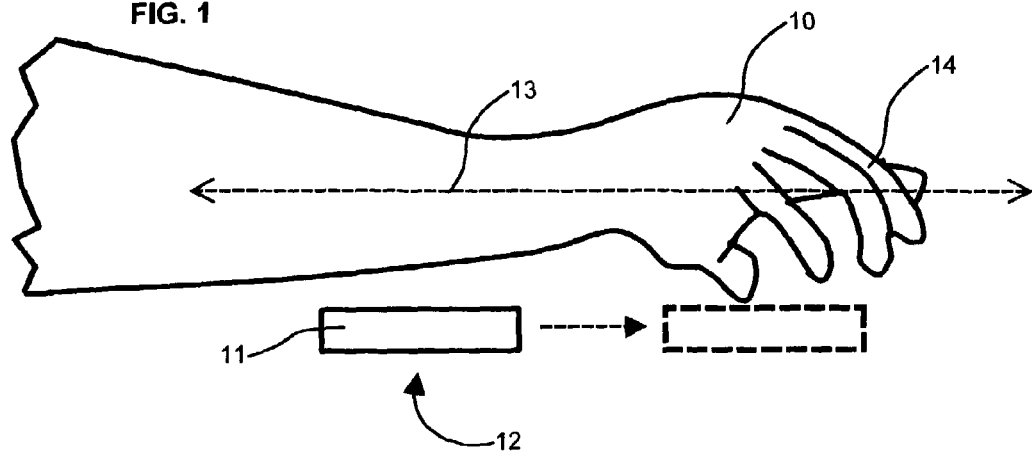
FIG. 1 depicts a side view of a user interface device in wrist-adjacent position, from which position the device can move in a line which is substantially parallel to a depicted line described by the user's forearm to the position depicted in FIG. 2.
Figure 2:
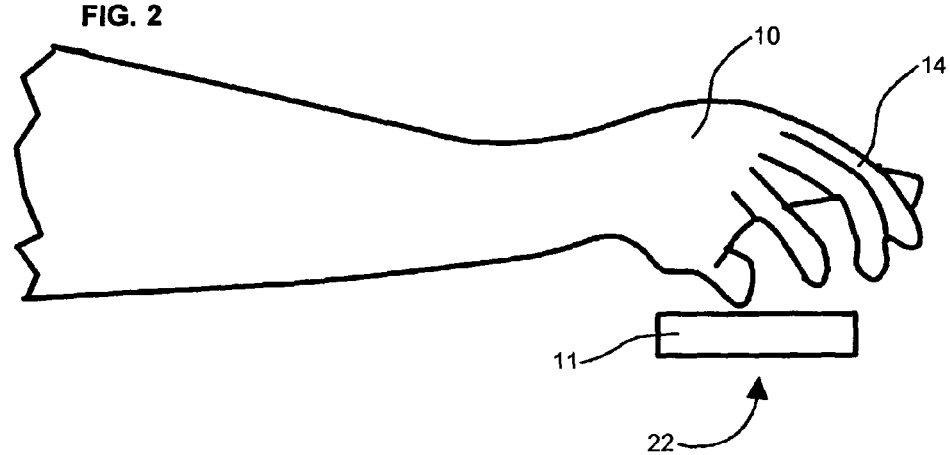
FIG. 2 depicts a side view of a user interface device in palm-adjacent position.
Figure 3:
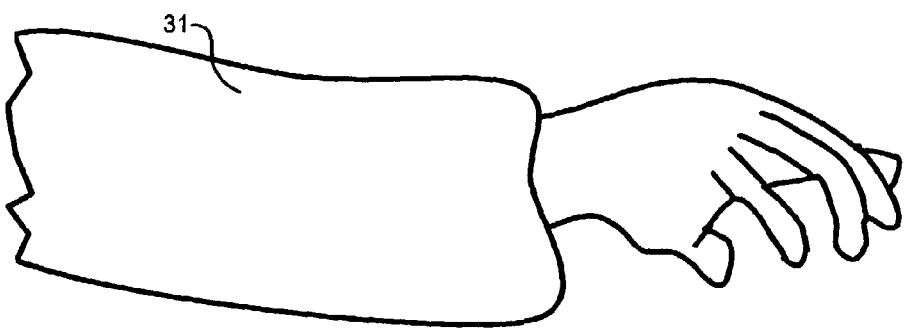
FIG. 3 depicts a side view of a user's shirt sleeve covering a user interface device in wrist-adjacent position.

FIG. 1 depicts a side view of a user interface device 11 in "wrist-adjacent" position 12. FIG. 2 depicts this user interface device 11 in "palm-adjacent" position 22. When the user interface device 11 is in palm-adjacent position 22, the user 10 can manually interact with the device 11 using the fingers 14 proximate to the device 11. When the interface device is in wrist-adjacent position 12, the device can be covered with a user's shirt sleeve 31 as depicted in FIG. 3. As shown, the interface device 11 or "handpiece", which can be or include any number of data entry or other electronic or mechanical parts as described below, moves from wrist-adjacent position to palm-adjacent position in a line that is substantially parallel to the line 13 described by the forearm of the user 10.

Figure 4:
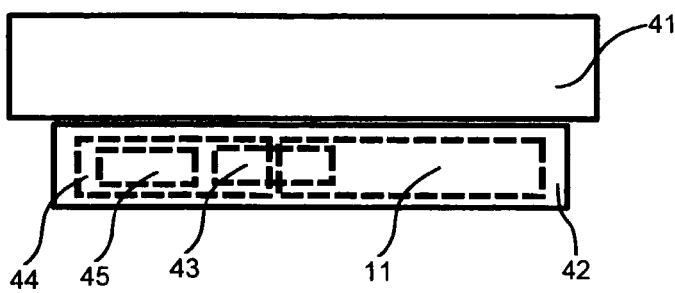
FIGS. 4 and 5 depict a side view of the basic parts of a wrist-wearable apparatus that supports a user interface device in such a way as to allow it to move from wrist-adjacent to palm-adjacent position.
Figure 5:
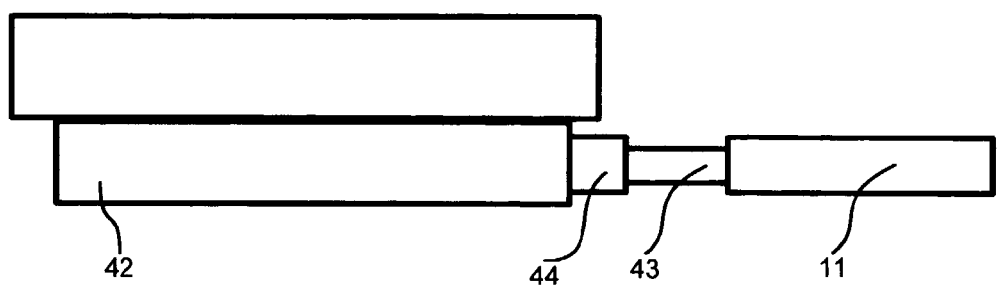

FIG. 4 depicts a side view of a user interface device 11 inside a housing 42. A base member 44 also resides in the housing 42 and is attached to the interface device 11 by way of a connection member 43. The connection member 43 collapses into the base member 44 and the interface device 11. The housing 42 is mounted upon an arm-attachment mechanism 41, which can be any of the specific arm-attachment mechanisms depicted and described below. A battery 45 is removably mounted in the base member 44 to provide power to the user interface device 11 by way of the connection member 43; alternately the handpiece 11 can include its own power source. The base member 44 and interface device 11 are movably attached to the housing 42 so that the interface device 11 can be deployed as depicted in FIG. 5. The connection member 43 comes partly out of the base member 44 and the interface device 11 while remaining attached thereto, and the base member 44 comes partly out of the housing 42 while remaining attached thereto.

Figure 6:
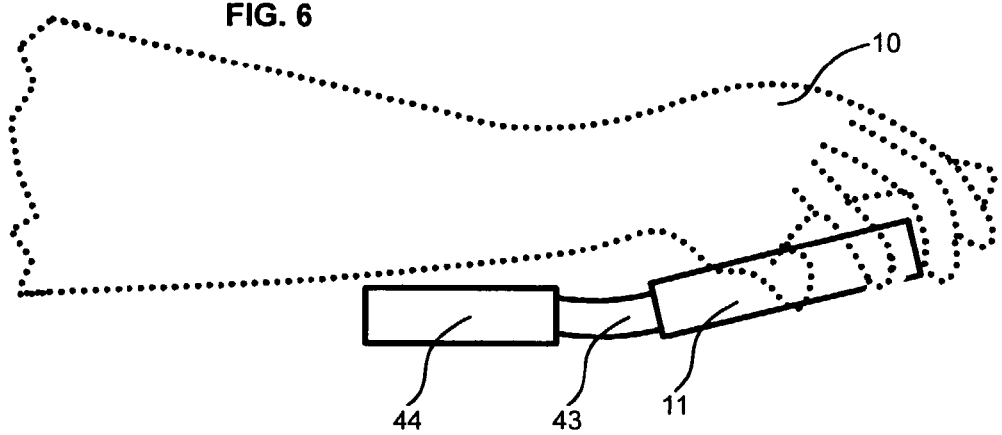
FIG. 6 depicts a side view of the movable components of a wrist-wearable device being worn and manipulated by a user.

The connection member 43 is flexible so that it can bend and/or twist to accommodate repositioning of the interface device 11 by the user 10 as depicted in FIG. 6. The connection member 43 may be made of a flexible material, such as rubber or plastic, or can be a metal coil spring so that it can bend and then return to its normal shape.

Figure 7:
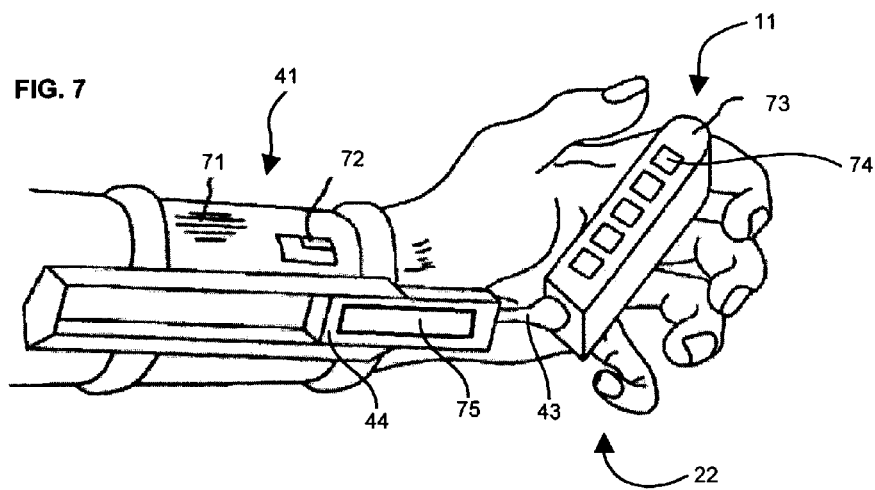
FIGS. 7 and 8 depict a perspective view of a wrist-wearable audio recorder in use, wherein a keypad for manual input of electronic data is provided so that it can move from wrist-adjacent position to palm-adjacent position and back to wrist-adjacent position as desired by the user.
Figure 8:
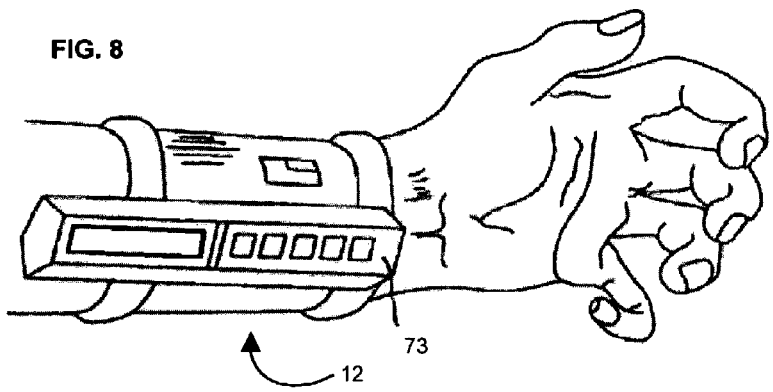

FIG. 7 depicts an arm attachment mechanism 41 that includes a microphone 71 and a display 72. The interface device 11 is a keypad 73 that includes several buttons 74 for controlling a digital audio recorder included in the arm attachment mechanism 41 so as to serve as a personal dictation machine. As depicted in FIG. 7, the keypad 73 is in palm-adjacent position 22, such that the interface device 11 and connection member 43 are fully deployed, and the base member 44 is partly deployed. In FIG. 8, the interface device 73 is in wrist-adjacent position 12. It provides buttons 74 for "start" and "stop" recording functions, "rewind" and "fast forward", etc., which commands are communicated to the audio recorder on the arm piece electrically by wire or wireless transmission. Alternately, the microphone, loudspeaker, and digital audio recorder and data storage medium can all be included in the handpiece 73. When retracted, the manually operable keys of the manual interface 73 remain accessible to the opposite hand of the user but are out of the way of the hand of the arm upon which the device is worn.

Figure 9:
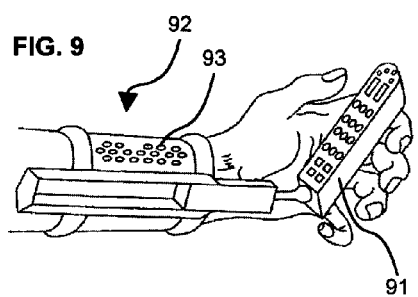
FIG. 9 depicts a perspective view of a wrist-wearable remote control.

FIG. 9 depicts an alternate arm-attachment mechanism 92 that includes a number of manually operable keys 93. The deployable interface device 91 is a dedicated multi-media remote control for a television set, stereo, or other audiovisual equipment, including a number of keys as well as a radio transmitter. It provides buttons for volume, channel, TV/VCR mode selection, etc., and may alternately be used in conjunction with an arm piece which provides a full set of miniature alphanumeric keys as shown or used separately.

Figure 10:
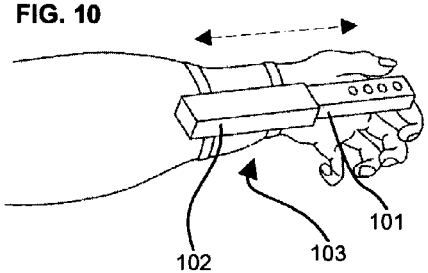
FIG. 10 depicts a perspective view of a spring-loaded, wrist-wearable manual interface device.

FIG. 10 depicts an alternate arm attachment mechanism 103 whereof the housing 102 is spring-loaded so that the interface device 101 pops out automatically when released similar to the action of a switchblade or jack-in-the-box. The deployed device 101 can be collapsed back into the housing 102 when manual pressure is applied in the opposite direction of the ejection force.

FIG. 11 depicts the back of an interface device 111 that is mounted on the connection member 112 by way of a ball-and-socket joint 114. The connection member 112 rests in a groove 113 that grasps the connection member 112. The connection member 112 can be released from this groove 113 so as to allow relative motion between the connection member 112 and the interface device 111 as depicted in FIG. 12.

FIG. 13 depicts the front of this interface device 111 which is a wireless telephone 111, that includes several keys 131 for manual entry of a telephone number, a loudspeaker 132, and a deployable microphone 133.

Figure 14:
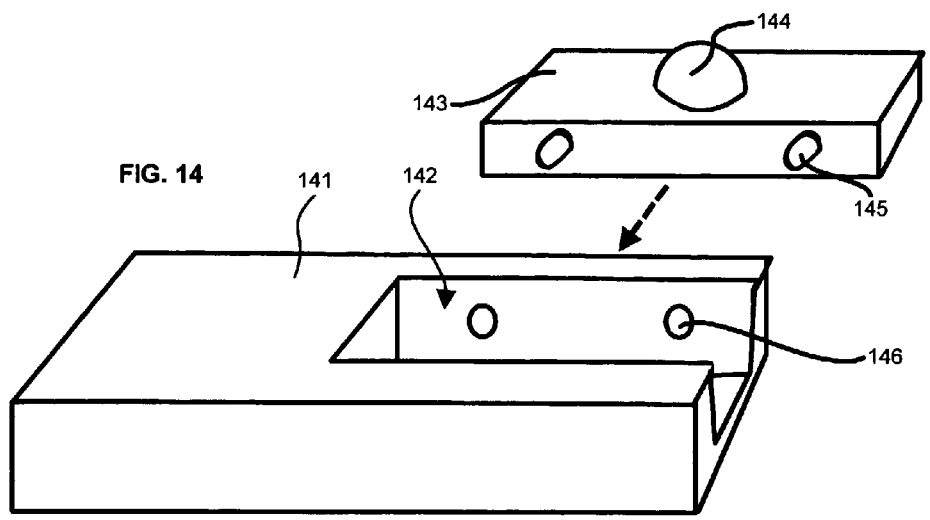
FIGS. 14 and 15 depict perspective views of an alternative embodiment that provides a particular handpiece that includes a cradle and an electronic port for electrical coupling to a removable attachment so as to serve as a docking station for said attachment.

FIG. 14 depicts a perspective view of an alternate deployable interface device. In the depicted case, the interface device 141 includes a cradle 142 into which any number of attachments can be inserted. An attachment piece 143 that includes a trackball 144 for use as a cursor positioning device is also depicted. This attachment 143 fits into the cradle 142 and locks into position by virtue of the spring-loaded pegs 145 that fit into sockets 146 in the walls of the cradle 142.

Figure 15:
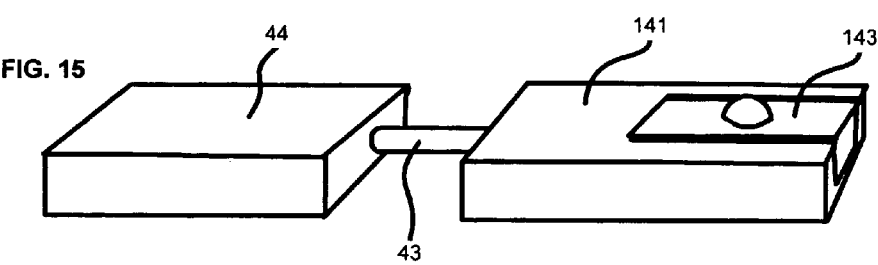

FIG. 15 depicts this attachment 143 after it has been placed in the cradle so as to form an integrated whole with the remainder of the interface device 141, which is in turn mounted on the connection member 43 that is movably connected to the base member 44.

Figure 16:
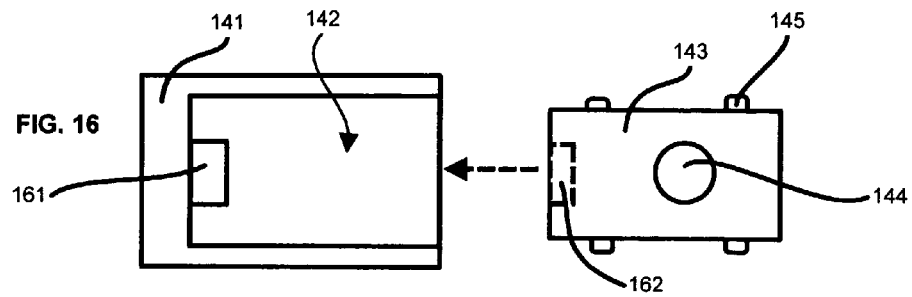
FIGS. 16 and 17 depict anterior views of the attachment being placed in the handpiece docking station.
Figure 17:
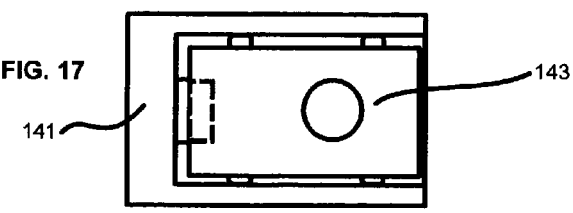

FIG. 16 depicts an anterior view of the same interface device 141 including the cradle 142 into which the attachment 143 can be inserted. Also visible from the depicted angle is a port 161 in the interface device 141 that is configured to electrically couple to a corresponding port 162 on the back of the attachment 143. This electrical coupling is similar to that used in the case of a Palm PDA and Palm docking station. This coupling makes possible both exchange of information between devices and powering and/or recharging of internal electrical components of the attachment 143. FIG. 17 depicts an anterior view of the attachment piece 143 after it has been inserted into the interface device 141 so that the electrical coupling between these devices is accomplished thereby making possible the exchange of electrical power and digital data between the attachment piece 143 and the interface device 141 as well as any other components in electrical communication with the interface device 141.

FIG. 18 depicts a side view of the interface device 141, from which protrudes the trackball 144 mounted on the attachment piece 143. FIG. 19 depicts a side view of the same interface device 141 after a different attachment has been inserted into the interface device 141. This attachment includes a short, rigid stylus 191 for use with a touchscreen display such as that of a Palm PDA. FIG. 20 depicts the device 141 in FIG. 19 in use by a user 10 so as to interact with a PDA 201.

Figure 22:
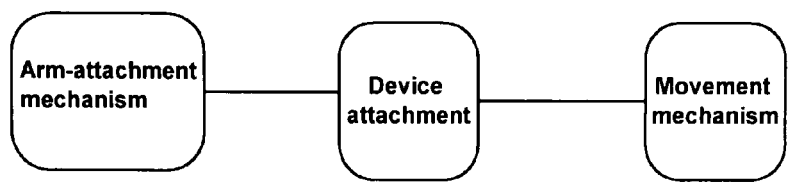

FIGS. 21 and 22 depict components of the present system in schematic form.

Figure 23:
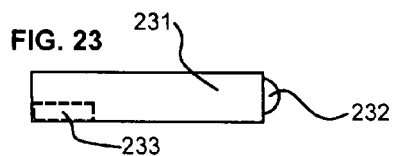
FIGS. 23 through 35 depict side views of different attachments that can be used with the handpiece docking station system.

FIG. 23 depicts a side view of an attachment 231 that includes a laser pointer 232 for use in presentations, similar to the IOGEAR laser pointer/mouse. The attachment 231 also includes a port 233 for connecting to the corresponding port 161 (in FIG. 16) in the deployable docking station 141. A similar mechanism can be used in a laser-based distance meter.

Figure 24:
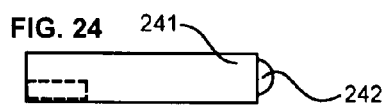

FIG. 24 depicts a side view of an attachment 241 that includes a scanner 242 for optical character recognition (OCR), similar to the Quicktionary scanner.

Figure 25:
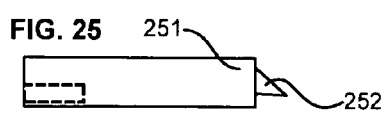

FIG. 25 depicts a side view of an attachment 251 that includes electrical blades 252 so as to serve as an electric hair clipper or razor.

Figure 26:
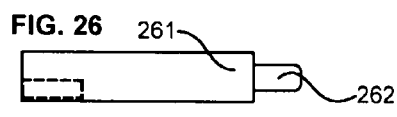

FIG. 26 depicts a side view of an attachment 261 that includes prongs 262 configured for use in voltage testing.

Figure 27:
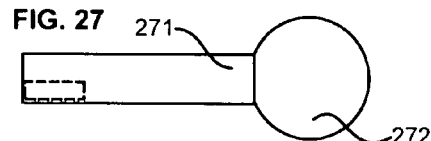

FIG. 27 depicts a side view of an attachment 271 that includes a microphone 272 for use in vocal performances, similar to common wireless lavaliere mics.

Figure 28:
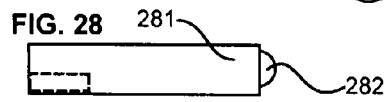

FIG. 28 depicts a side view of an attachment 281 that includes a digital camera lens 282.

Figure 29:
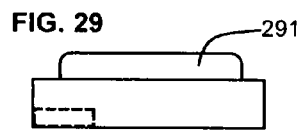

FIG. 29 depicts a side view of an attachment that includes a magnetic strip reader 291 for use in credit card transactions.

Figure 30:
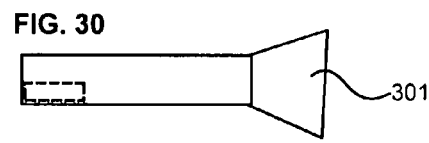

FIG. 30 depicts a side view of an attachment that includes an RF transceiver 301 for use in RFID applications.

Figure 31:
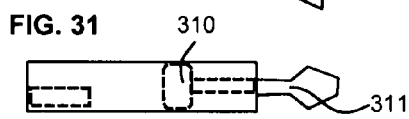

FIG. 31 depicts a side view of an attachment that includes an electric rotor 310 for turning a screwdriver 311.

Figure 32:
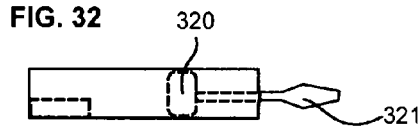

FIG. 32 depicts a side view of an attachment that includes an electric rotor 320 for turning a drill bit 321.

Figure 33:
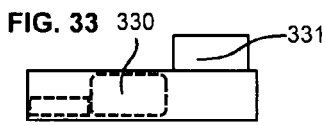

FIG. 33 depicts a side view of an attachment that includes an electric toothbrush 331 and internal vibrator 330.

Figure 34:

FIG. 34 depicts a side view of an attachment that includes an ultrasonic hardness tester 341.

Figure 35:

FIG. 35 depicts a side view of an attachment that includes a bottle opener 351, demonstrating that the wrist-wearable docking station can be used with attachment pieces that are non-electronic.

Figure 36:
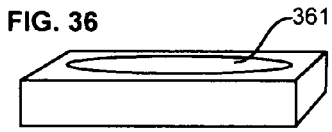
FIGS. 36 and 37 depict perspective views of such attachments.

FIG. 36 depicts a perspective view of an attachment that includes a touchscreen display 361.

Figure 37:
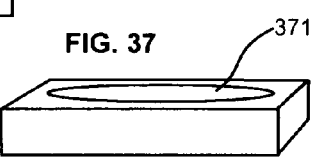

FIG. 37 depicts a perspective view of an attachment that includes a thermometer with a digital display 371.

FIGS. 38 and 39 depict side views of an alternate user-accessed device that includes a retractable camera 382 and viewfinder 381 in use. The viewfinder 381 and the remainder of the camera 382 are mounted on at least one rail 383 that is collapsible/extendable by telescoping function so that the handpiece 382 can move from wrist-adjacent position as in FIG. 38 to palm-adjacent position as in FIG. 39. Power supply, data storage, and other heavier components are mounted on/in the arm piece 384.

FIG. 40 schematically depicts the basic data-processing and other electrical components of a user interface device, attachment piece, base member, and/or arm-attachment mechanism that may be used in the present system.

Figure 41:
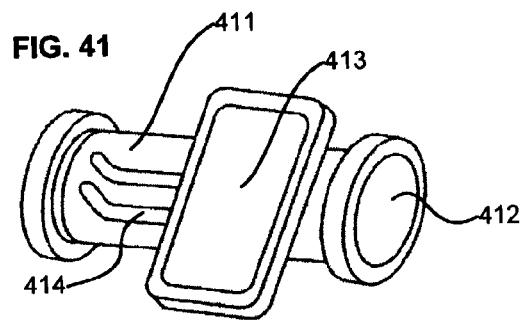
FIGS. 41 and 42 depict perspective views of an alternative embodiment that provides a touchscreen monitor mounted on an arm piece so as to move in a line that is substantially parallel to the line described by the user's forearm when the arm piece is being worn on said arm.
Figure 42:
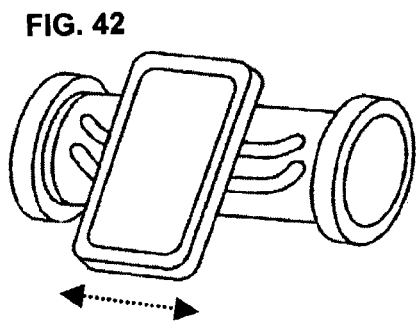

FIGS. 41 and 42 depict perspective views of an alternate arm-attachment mechanism 411 that includes a space 412 for the user's forearm and rails 414 upon which a touchscreen monitor 413 is movably mounted. The AAM 411 includes both an inner tube and an outer tube that can revolve independently of each other so as to allow revolution of external components about the user's forearm.

Figure 43:
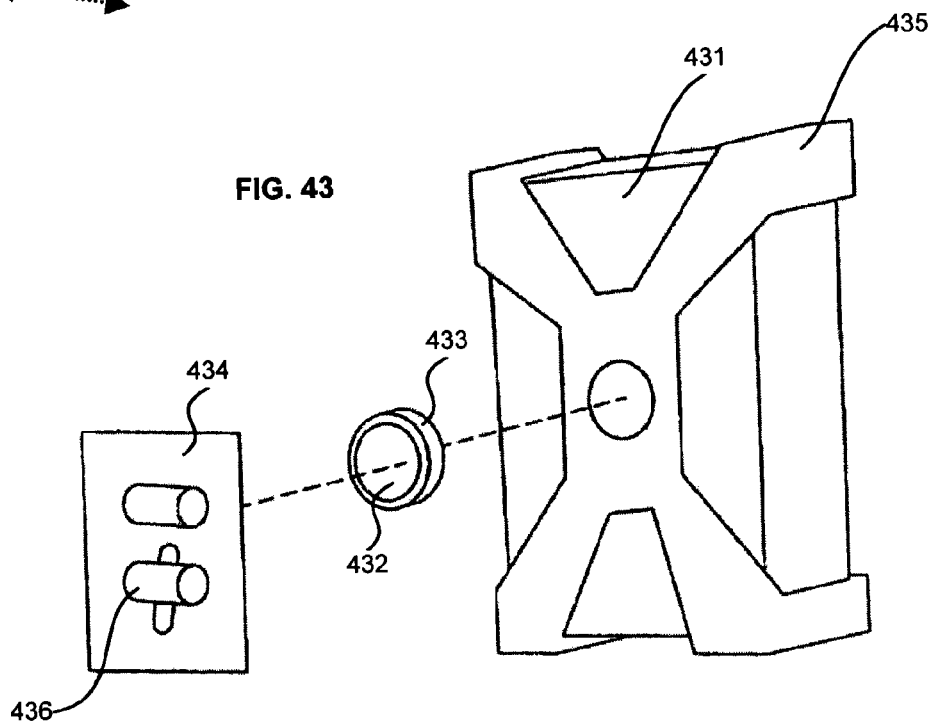
FIG. 43 depicts an exploded view of an alternative embodiment that provides a mechanism by which a pre-existing PDA, such as the Apple Newton or Palm PDA, can be removably mounted on an arm-attachment mechanism.

FIG. 43 depicts an exploded view of certain components of an alternative embodiment in which a PDA 431 is removably held by a grasping cradle 435. The cradle 435 is in turn movably mounted upon a post 433 that is mounted upon a backplate 434 so as to allow relative swiveling motion of the cradle 435 with respect to the backplate 434. Two tubes 436 to be attached to the rails 414 in FIG. 41 are movably mounted on the backplate 434.

FIG. 44 depicts an alternate arm attachment mechanism 440 that includes a picture frame-like display 441 into which paper panels bearing barcodes 442 can be removably inserted. A bar-code scanner stylus 443 is tethered to the remainder of the arm piece 440 by way of an electrical cable 444. The scanner 443 can be removably inserted into a clip 445 when not in use.

FIG. 45 depicts an alternate arm-attachment mechanism 450 that includes a magnetic strip reader 455, keys for manual entry of data 454, paper 452, and a printer 453 so as to serve as a portable point-of-sale (POS) terminal for credit card transactions.

FIG. 46 depicts an alternate arm-attachment mechanism 460 that includes bars 461 that can be attached by straps (shown in FIG. 51B) to a user's forearm. Mounted on these bars 461 are two tracks/rails 462 and two telescoping support members 463. An alternate handpiece 464 is movably mounted upon these support members 463 so as to be accessible to the hand of the arm upon which the unit 460 is worn.

Figure 47:
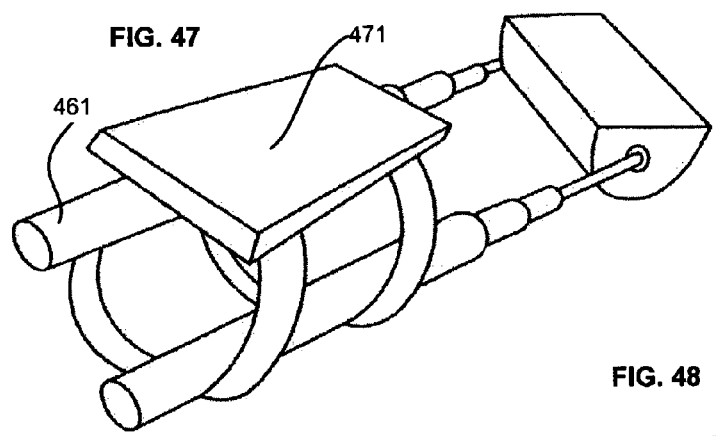
FIGS. 47 and 48 depict perspective views of a housing movably mounted upon a track mechanism so as to be able to revolve around the user's arm.
Figure 48:
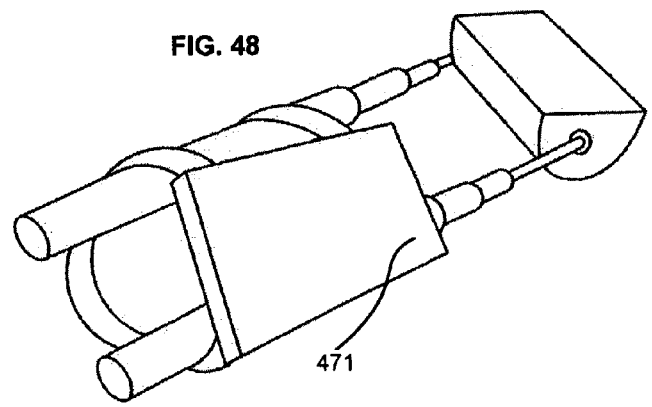

FIGS. 47 and 48 depict a display 471 that is movably mounted upon the rails 462 so that it can revolve around the axis described by the user's forearm to different positions as shown.

Figure 49:
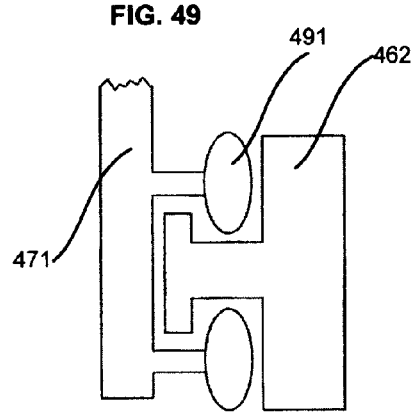
FIGS. 49 and 50 depict cross-sectional views of alternate mechanisms by which a housing can be movably mounted upon a track mechanism.
Figure 50:
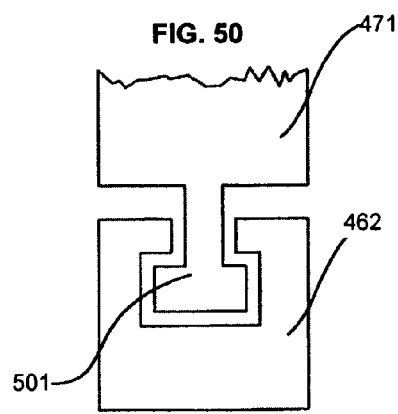

The display 471 can be movably attached to the rails 462 in a number of ways. FIG. 49 provides one example, wherein wheels 491 are set in a track on a rail 462. FIG. 50 provides another example, wherein the leg 501 of the monitor housing 471 interlocks with a groove in the rail 462.

Figure 51A:
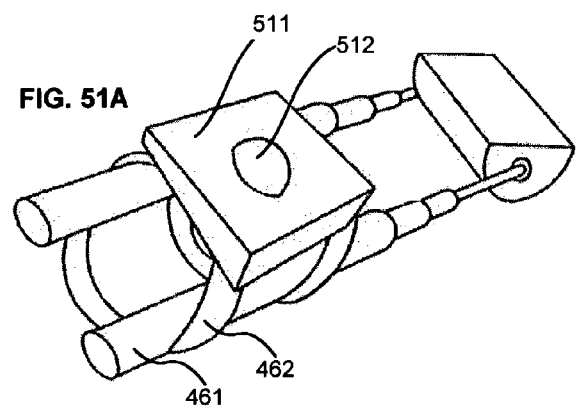
FIG. 51A depicts a perspective view of an alternative embodiment that provides a housing that includes a ball-and-socket joint.
Figure 51B:
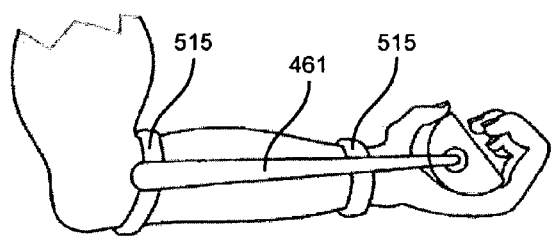
FIG. 51B depicts a side view of certain components of an arm-attachment mechanism being worn on the arm of a user.
Figure 57:
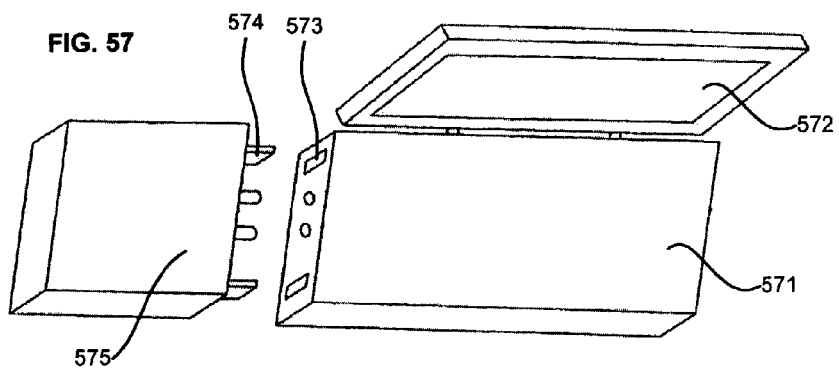
FIGS. 57 through 60 depict perspective views of components of a notebook-style computer that can be reconfigured for wearable use as an alternative to the housings depicted elsewhere herein.
Figure 58:
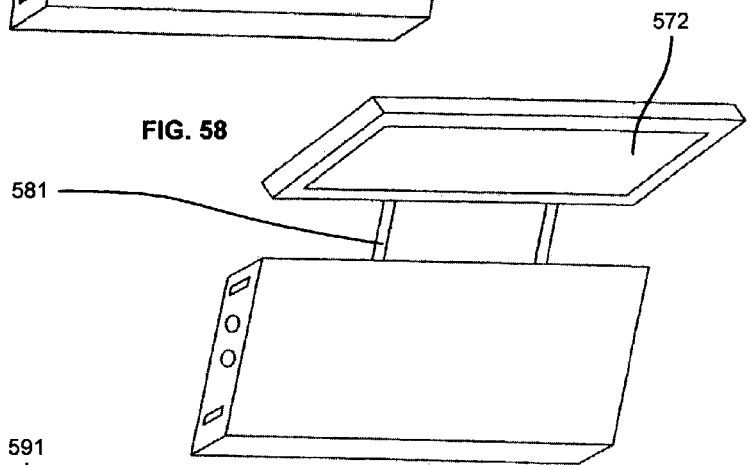
Figure 59:
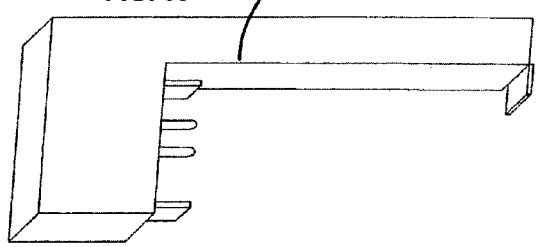
Figure 60:
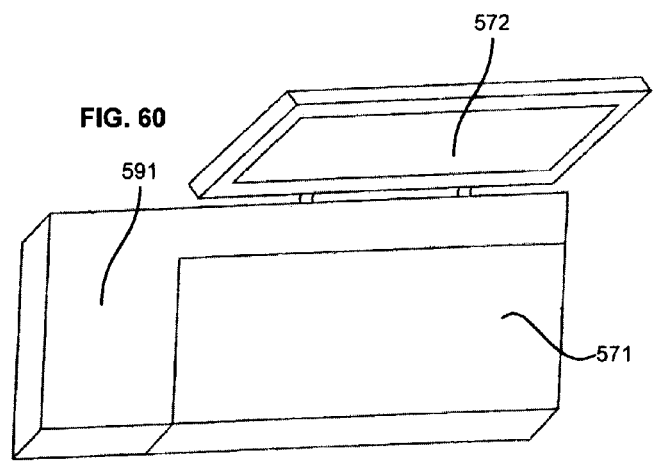

FIG. 51A depicts a platform member 511 which is movably mounted upon the rails 462 and which includes a ball-and-socket joint 512. FIG. 51B depicts the manner in which the bars 461 may be attached to the user's forearm by way of straps 515.

FIG. 52 depicts a housing 521 that has been mounted upon the ball-and-socket joint 512 so that it can swivel and/or tilt relative to the platform member 511. FIG. 53 depicts this housing 521 after it has swiveled into a new position. This housing 521 can include a touchscreen monitor, manually operable keys, audio input and output devices, or other electrical components.

FIGS. 54 and 55 depict a video monitor 541 that is jointed to a housing 542 so that it can tilt with respect to the housing 542 and then be stabilized by a movable prop rod 551. Such a housing can be alternately mounted on the various arm pieces disclosed herein.

FIG. 56A depicts an arm attachment mechanism 562 upon which a display 561 is movably mounted by way of a ball-and-socket joint 567. Manually operable keys 563 are also provided, as is a hand piece 566 movably mounted upon cantilevered support members 565 born by the arm piece 562. When being worn, the hand piece 566 can be accessed by the fingers 564 of the hand of the arm upon which the unit is worn.

FIG. 56B depicts the hand piece 566 removed from the support members 565 so that one peg 568 of the two pegs by which the hand piece 566 is connected to the support mechanism 565 can be seen. The hand piece 566 can swivel on these pegs with respect to the support mechanism 565.

FIGS. 57 through 60 depict a notebook-type computer that can be reconfigured so that it can either be used as a laptop/palmtop computer or can be worn on a user's forearm by way of the disclosed arm-attachment mechanisms. The keyboard 571 can be physically and electrically coupled to a removable extension piece 575 by way of socket 573 and plug 574 mechanism. When this extension piece 575 is removed, the unit is ideally suited for wearable use as per the mechanisms described above for arm-mounting a housing. The monitor 572 is also set on rails 581 so that it can be spaced apart from the keyboard 571 so as to accommodate a larger extension piece 591. When this larger extension piece is in place 591, thereby providing additional keys and/or other means of data entry, the unit is ideally suited for use as a laptop.

FIG. 61 depicts a sliding window 612 in a window frame 611. Also mounted in the window frame 611 is a window-mounted air-conditioner 613. This air-conditioning unit 613 is similar to conventional window-mounted air-conditioners except that this unit also provides a battery recharger 614 in which are shown two batteries 615. FIG. 62A depicts a side view of this air-conditioning unit 613 in the window frame 611. From the side, a solar energy collector panel 623 can be seen. Equipped with photovoltaic cells like a standard solar panel, this panel 623 is movably mounted upon the air-conditioner 613 by way of a hinge 622. Air is taken into the air-conditioner by way of the side air vents 621 since the use of a rear intake is made difficult by the presence of a solar panel 623.

FIG. 62B depicts a side view of an alternative embodiment wherein there is no air-conditioner. A smaller window-mountable unit 625 fits in the window frame 611 and bears the hingedly mounted solar panel 623. Such a unit can be used to power an included battery charger as shown in FIG. 61 or other electrical components.

By function of the hinge 622, the solar panel 623 can be moved into a horizontal position such as that depicted in FIG. 63 so as to collect light from the sun, convert it to electricity, and conduct this electricity to the battery charger 614 by way of a conduit 631 inside the air-conditioner 613. A prop rod 624 provides additional support for the solar panel 623 when it is deployed. Batteries 615, once charged, can be placed back into the base member 44 to power the wrist-wearable device disclosed herein.

Figure 64:
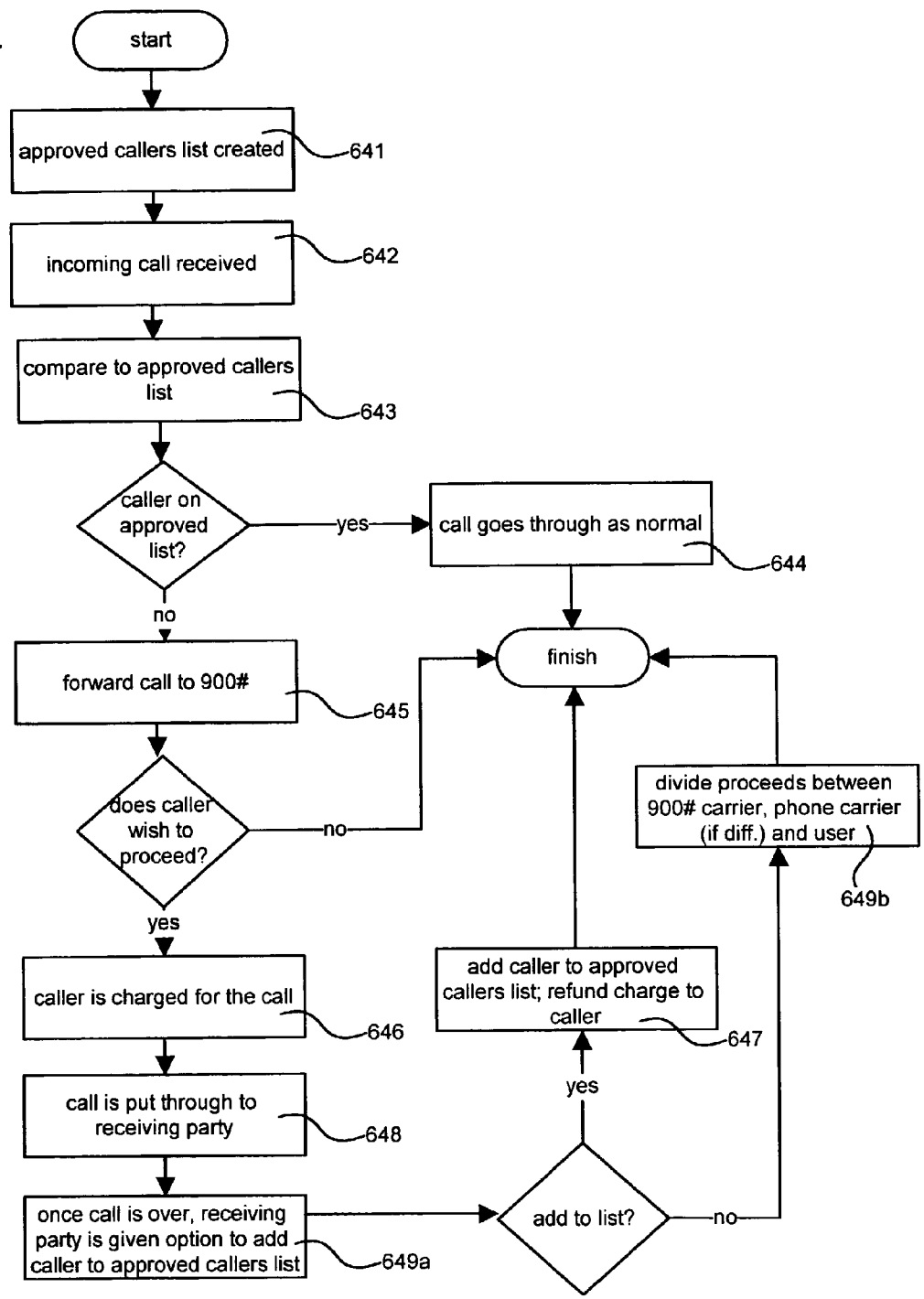
FIG. 64 depicts a flowchart illustrating the process by which telephone callers are screened and, in some cases, charged to place a call to a wrist-wearable phone.

FIG. 64 depicts a flowchart of a process that can be used with the wrist-wearable mobile phone depicted above so as to decrease the incidence of unwanted telephone calls, such as those from telemarketers. First, an approved callers list is created by the user and stored in his phone or in a database maintained by his telephone carrier 641. When an incoming call is placed to the user's phone number 642, the caller's telephone number is compared to the approved callers list 643. If the incoming call is from a number on the approved callers list, the call is placed as normal 644. If the call is coming from a number that is not on the approved callers list, the call is forwarded to a "900" number by standard call forwarding procedure 645. As with conventional 900 numbers, the caller is given the option to proceed with the call or hangup; if the caller chooses to proceed with the call, he is billed a specified amount for use of the 900 number 646. The call is then placed through the 900 number carrier to the user's telephone as a normal call, except that it comes from the 900 number carrier initially and then the caller is added to the line once the user answers his phone 648. When the call is over, the user is given the option of adding the caller to the approved callers list 649*a*. The charge incurred by the caller for the incoming call is refunded if the user adds the caller to the approved caller list immediately after the call 647. Otherwise, the fee for the call can be split between the 900 number carrier, the user's telephone carrier (if different from the 900 number carrier), and the telephone user who has opted for participation in the disclosed call-screening system 649*b*.

Figure 65:
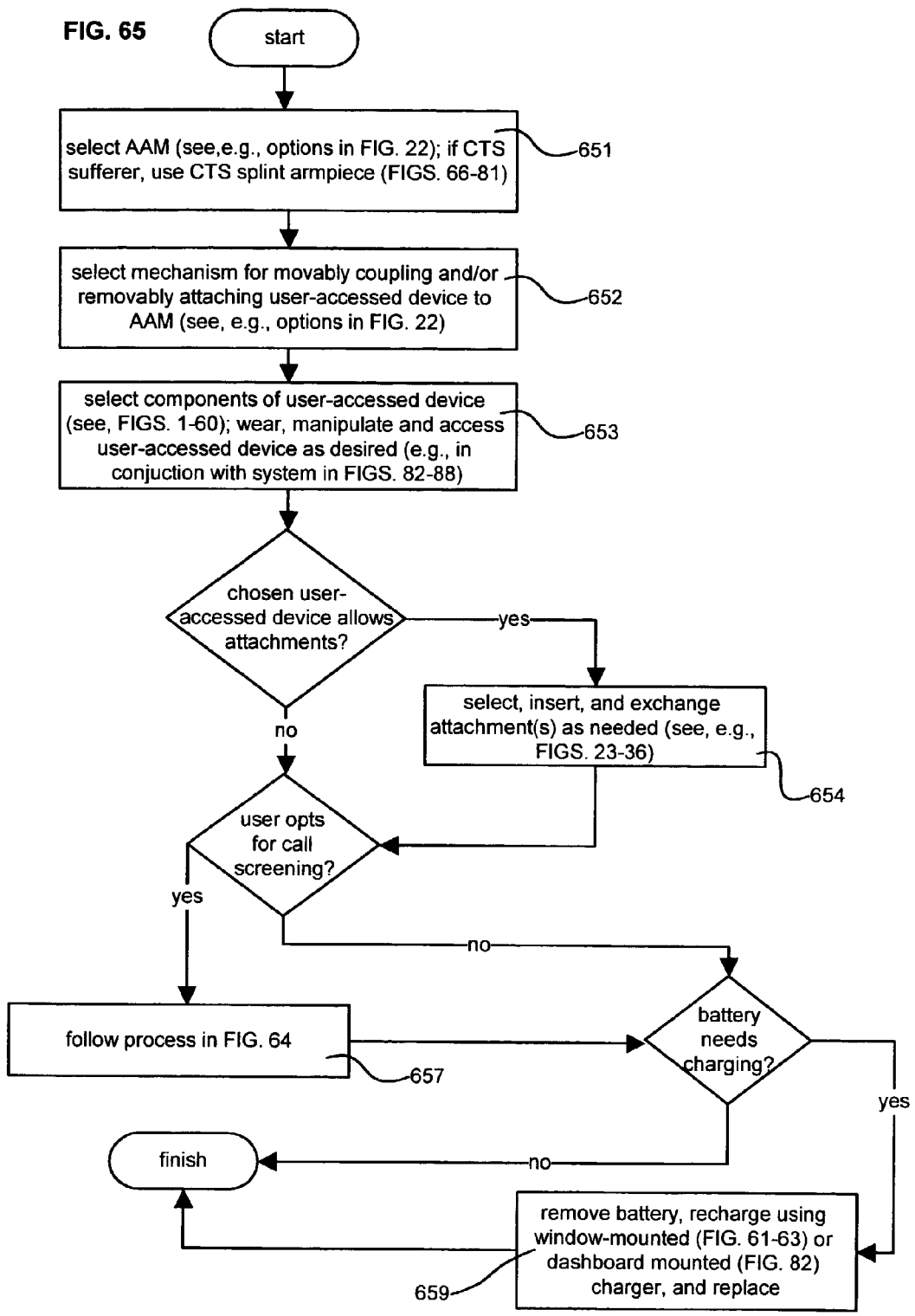
FIG. 65 depicts a flowchart illustrating the process by which a wrist-wearable device according to the present invention is constructed and utilized with the other related devices, applications, methods and systems disclosed herein.

FIG. 65 is a flowchart illustrating the process by which the device disclosed herein is manufactured and applied within the context of the systems disclosed herein by reference to the various figures appearing elsewhere herein.

Figure 66:
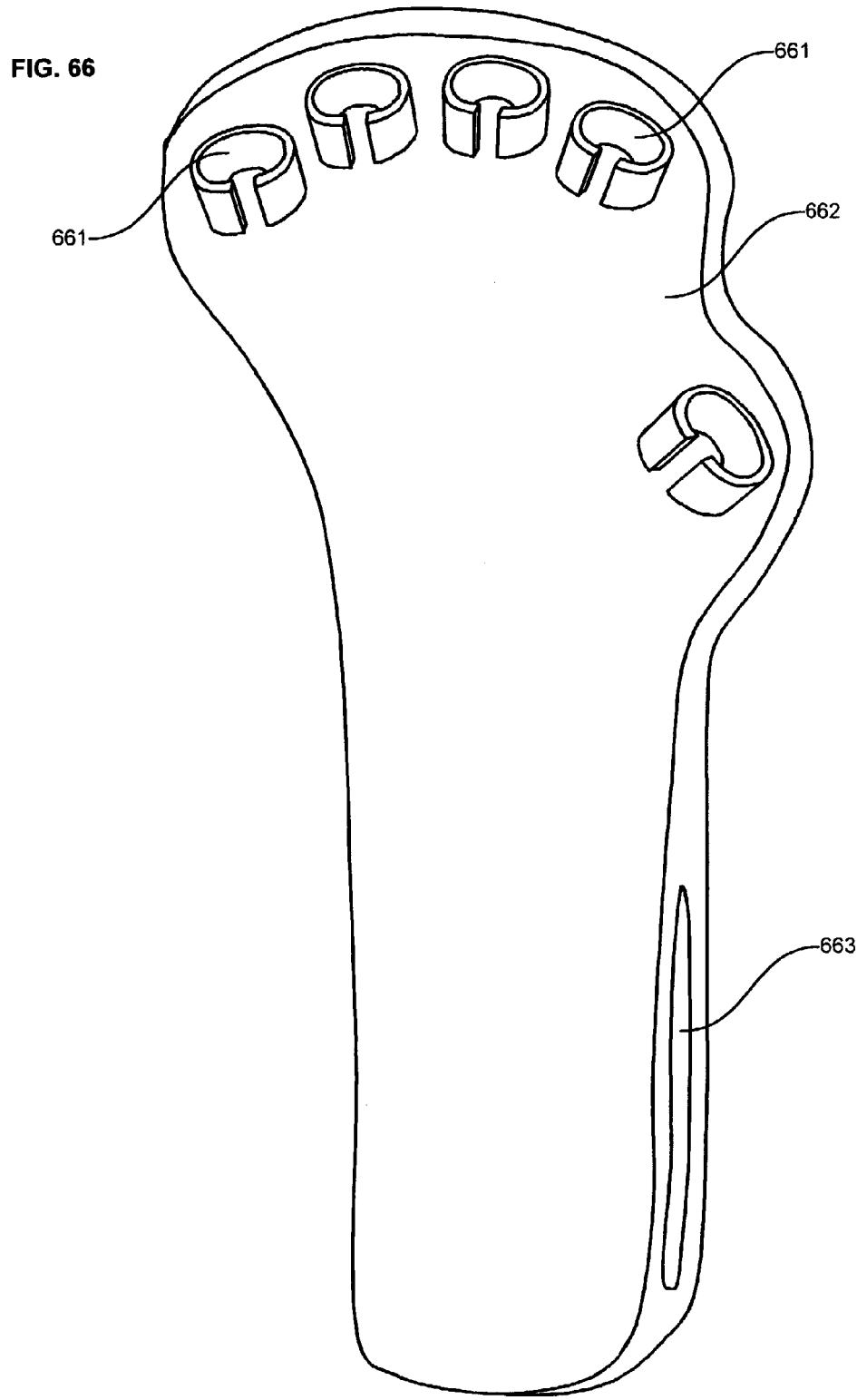

FIG. 66 depicts a perspective view of an alternate arm piece that provides a flexion-discouraging splint 662 to which are attached several open-sided rings 661. The splint 662 is made of plastic so as to be somewhat rigid and may alternately be covered with padding and/or fabric so as to be comfortable to a user or covered with a lightweight, breathable fabric that will not accumulate moisture so that the unit can be worn for extended periods of time. The splint 662 also contains a space 663 through which a bandage, strap or other attachment device can pass.

Figure 67:
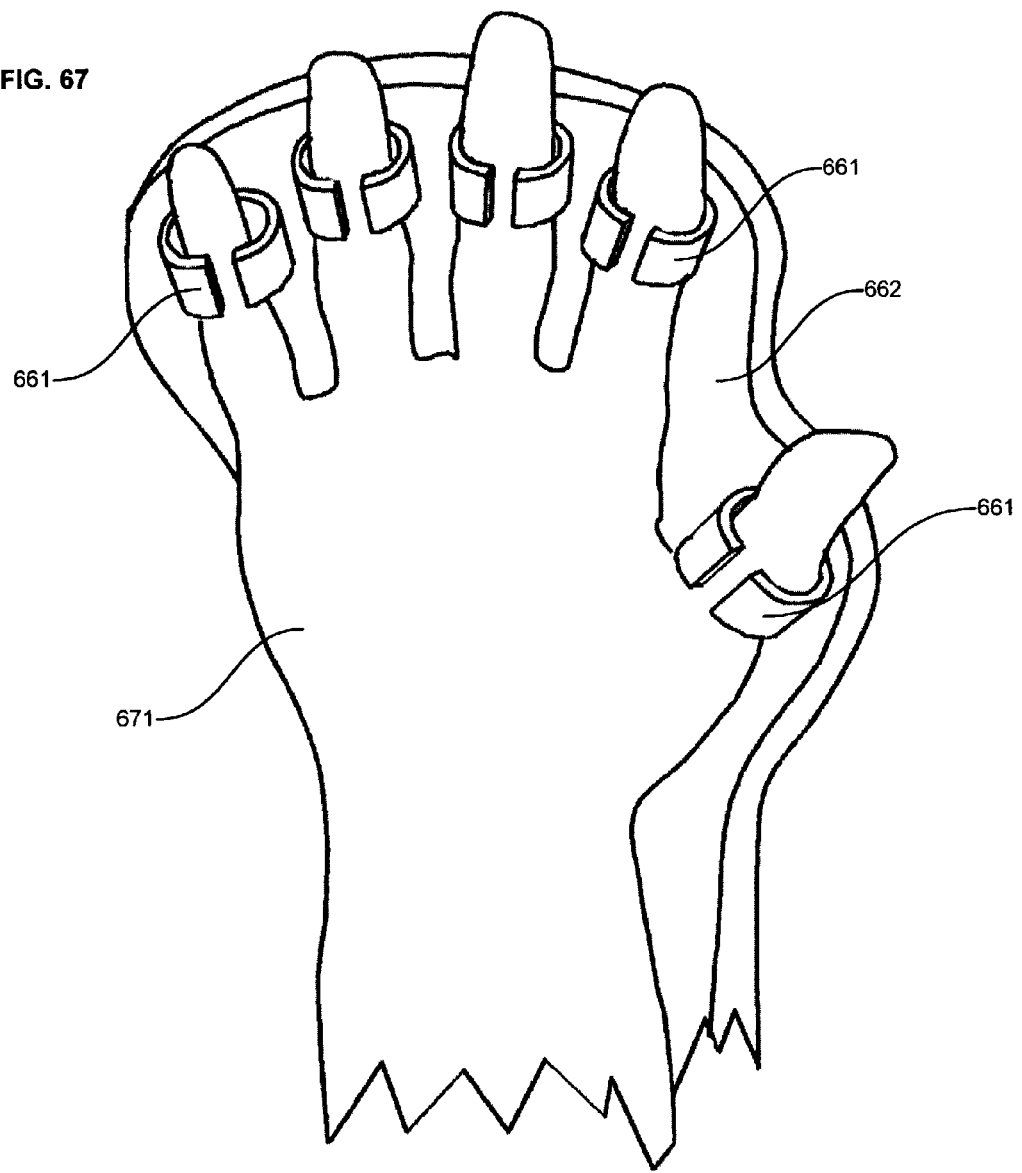

FIG. 67 depicts a perspective view of a portion of the splint 662 being worn by a user 671. The splint 662 is attached to the user's forearm and fingers by a forearm band (not shown in this FIG.) and several open-sided rings 661. The open-sided rings 661 fit partially around each of the user's fingers and are made of a flexible material, such as rubber or plastic, so that the user's fingers can pop out of the rings when she flexes her fingers to make a fist.

Figure 68:
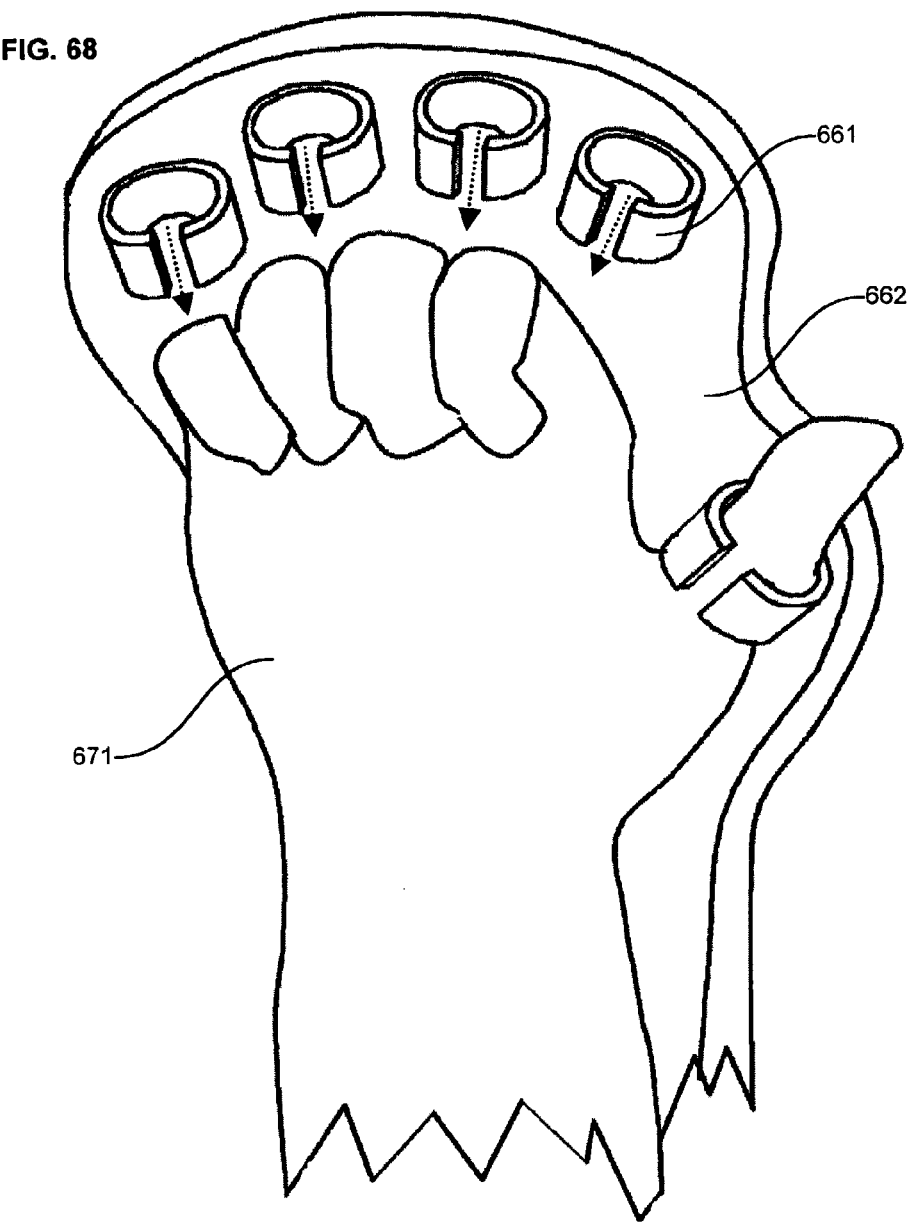

FIG. 68 depicts the hand and fingers of the user 671 when the fingers have been flexed so as to pop out of the open-sided rings 661.

Figure 69:
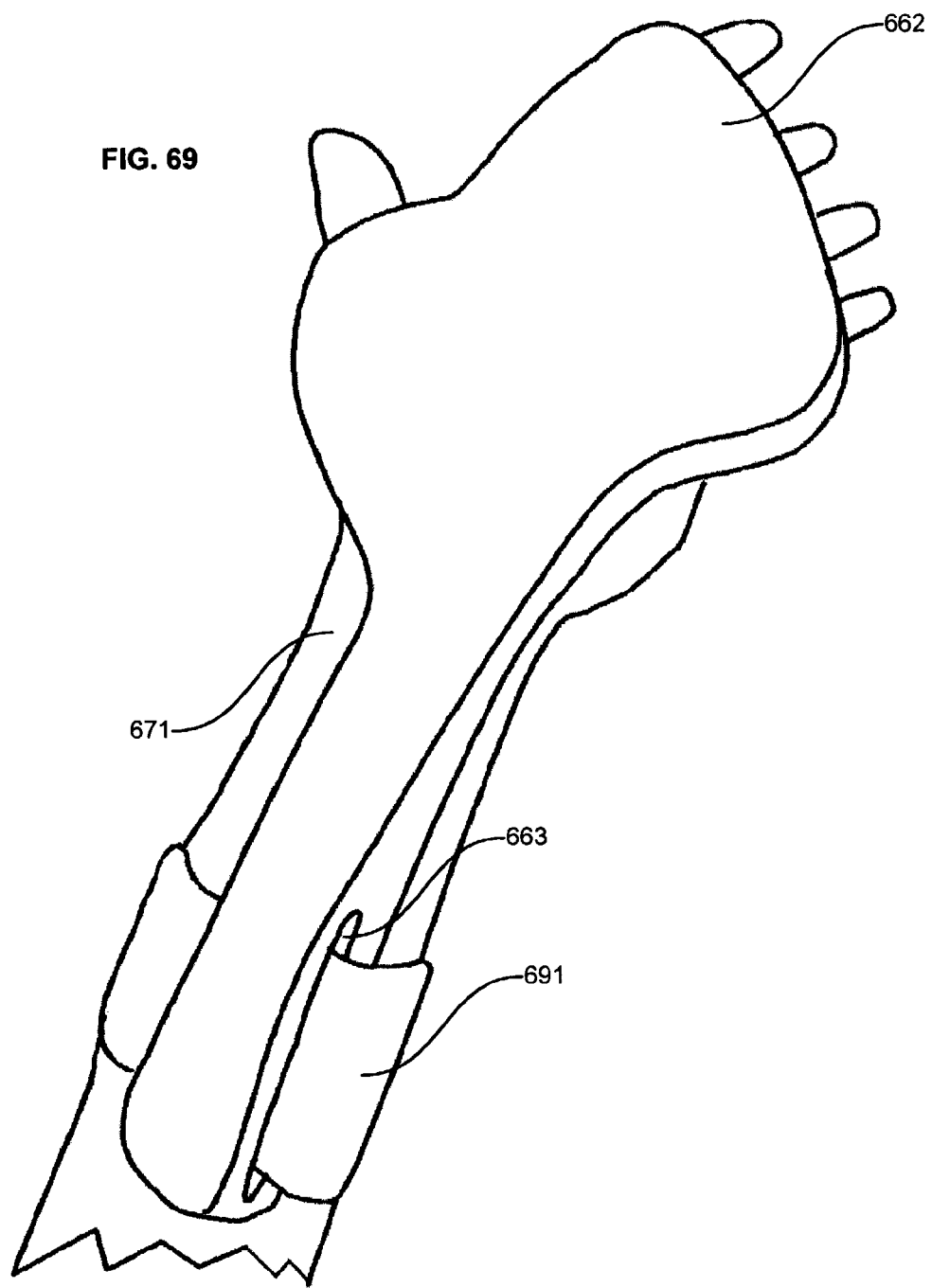

FIG. 69 shows a posterior view of the same elements depicted in FIG. 66. From this angle, the length of the flexion-discouraging splint 662 can be seen, along with the forearm band 691 which has been inserted into the space 663. The forearm band 691 can be made of a light, soft, breathable and flexible material, such as gauze, pantyhose material, or a typical ace bandage.

Figure 70:
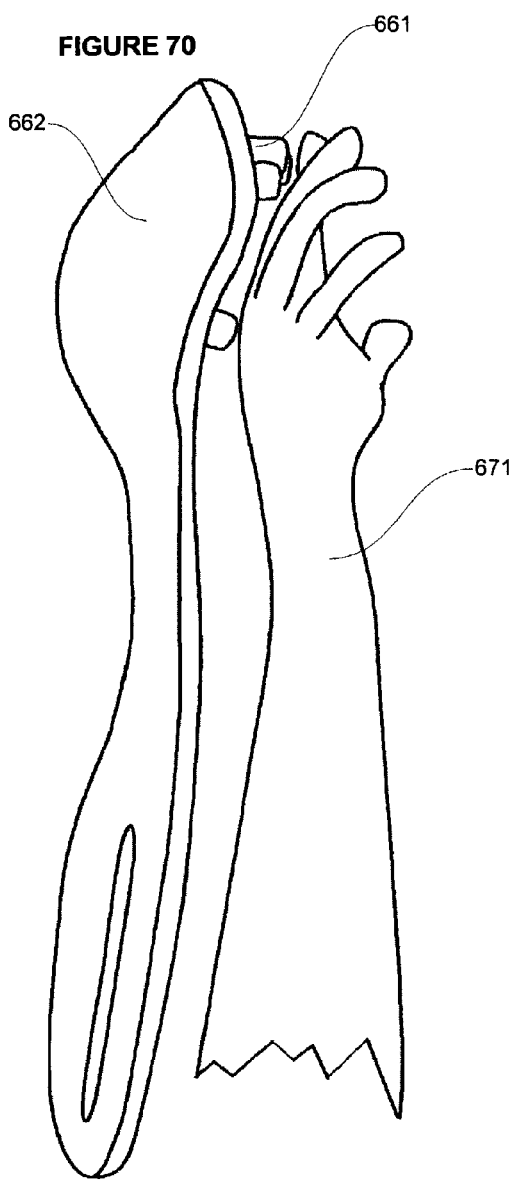
Figure 71:
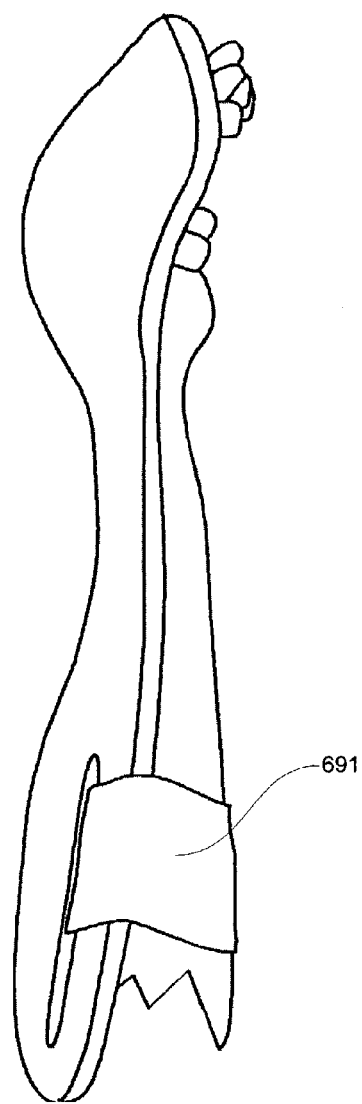

FIG. 70 depicts a side view of the splint 662 and the rings 661 before the unit has been placed on the user 671. FIG. 71 shows the unit after it has been attached to the user.

Figure 72:
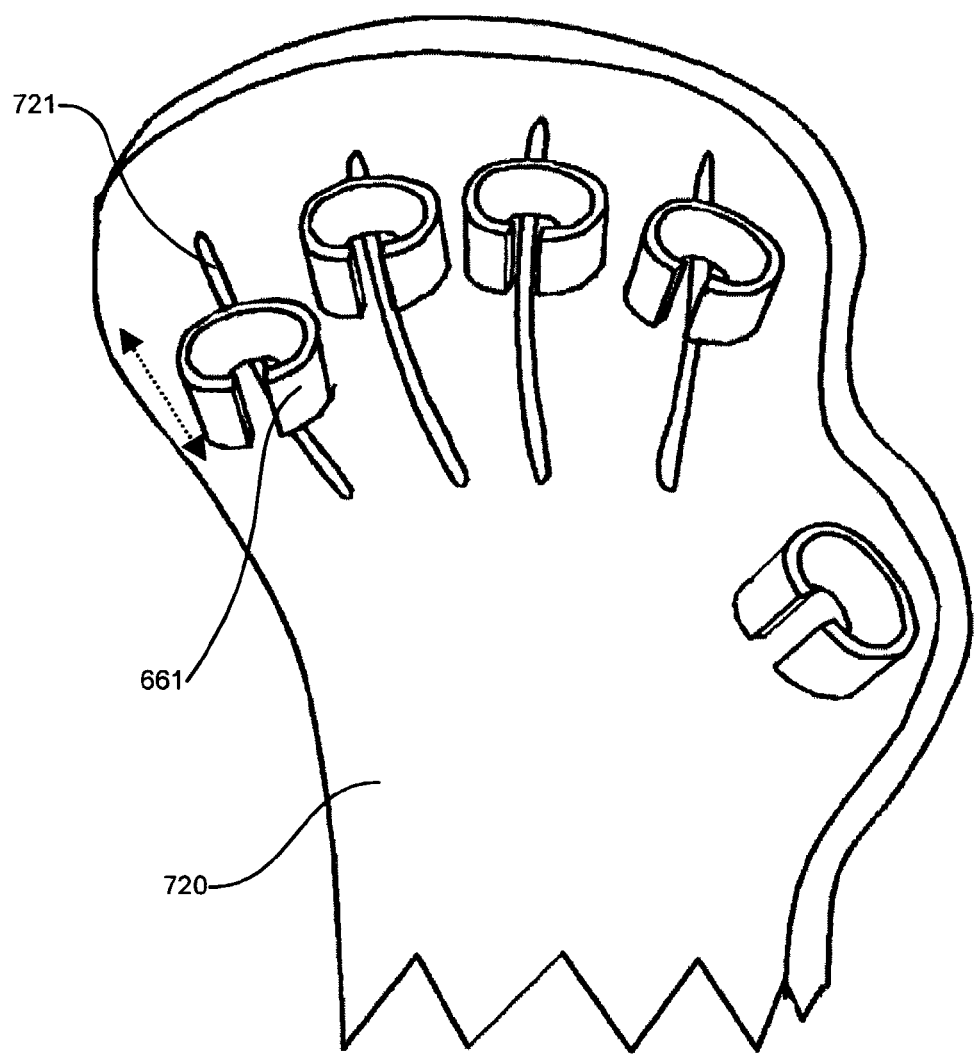

FIG. 72 depicts an alternative embodiment wherein each of the open-sided rings 661 are attached to the splint 720 so as to be able to move in a linear fashion along a groove 721 in the splint 720. Specifically, each ring 661 is mounted on a peg that fits into this groove 721 similar to the track mechanism depicted in FIG. 50. This construction allows a single device to serve many different sized hands and fingers.

FIG. 73 depicts another alternative embodiment of the splint 731 wherein the open-sided rings 661 are mounted upon individual slats 732 which are hingedly mounted to the splint 731 by way of a joint 734 that allows the slats to pivot along the axis of the joint 734. In this way, the user can spread and contract the distance between her fingers while they still remain inside the open-sided rings. Each slat 732 includes a groove 733 which allows for linear motion of the rings 661 as in the embodiment shown in FIG. 72.

Another alternative embodiment is depicted in FIG. 74. This alternative embodiment is made out of highly flexible, lightweight plastic that is shaped so as to be inflatable and so as to form a specific, complex shape when inflated. Essentially, this unit is constructed like a small, conventional inflatable raft. When filled sufficiently with air, the splint 741 becomes rigid as a result of air pressure. Small tendrils 742 protrude from the splint 741 so as to form curved shapes similar to the prongs of the open-sided rings appearing in other embodiments. These tendrils attach to the user's fingers just as the open-sided rings do in other embodiments. A valve 743 mounted on the back of the splint 741 can be partially seen from the depicted angle. This valve 743 is used to inflate and deflate the unit, which-inflation can be done by blowing air through the valve orally or using a small air pump. When air is removed from the unit, it is flat and limp as a deflated raft or toy.

Figure 75:
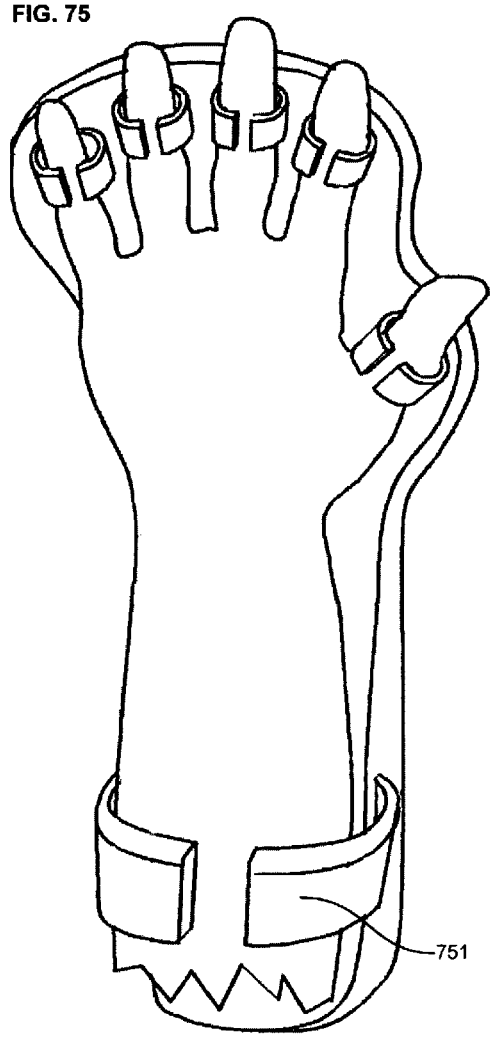

FIG. 75 depicts an alternative embodiment in which a larger open-sided ring 751 is used to attach to the user's forearm, thereby diminishing the pressure the unit exerts upon the muscles of the forearm.

Figure 76:
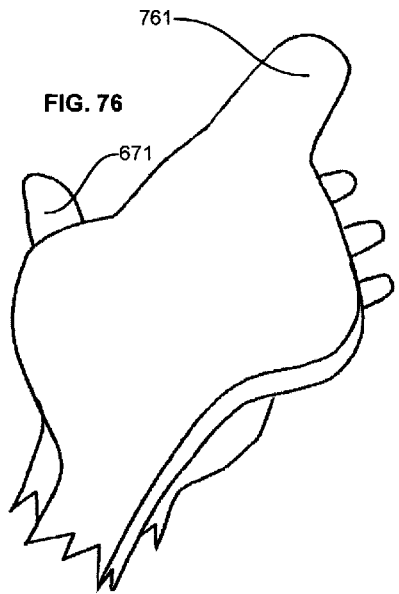

FIG. 76 depicts a portion of an alternative embodiment of the splint in which a section 761 of the splint protrudes above the user's index finger so as to serve as a sort of prosthetic finger which can be used for simple tasks when the splint is being worn.

Figure 77:
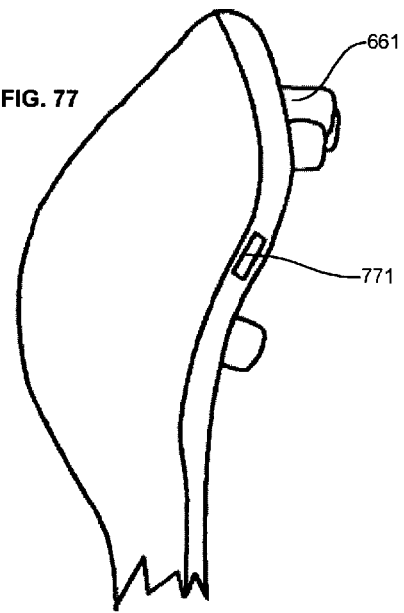

FIG. 77 depicts a side view of an alternative embodiment of the splint in which a socket 771 appears in the side of the splint. This socket 771 is designed to receive and hold attachments which can be used as accessories with the splint as depicted below.

Figure 78:
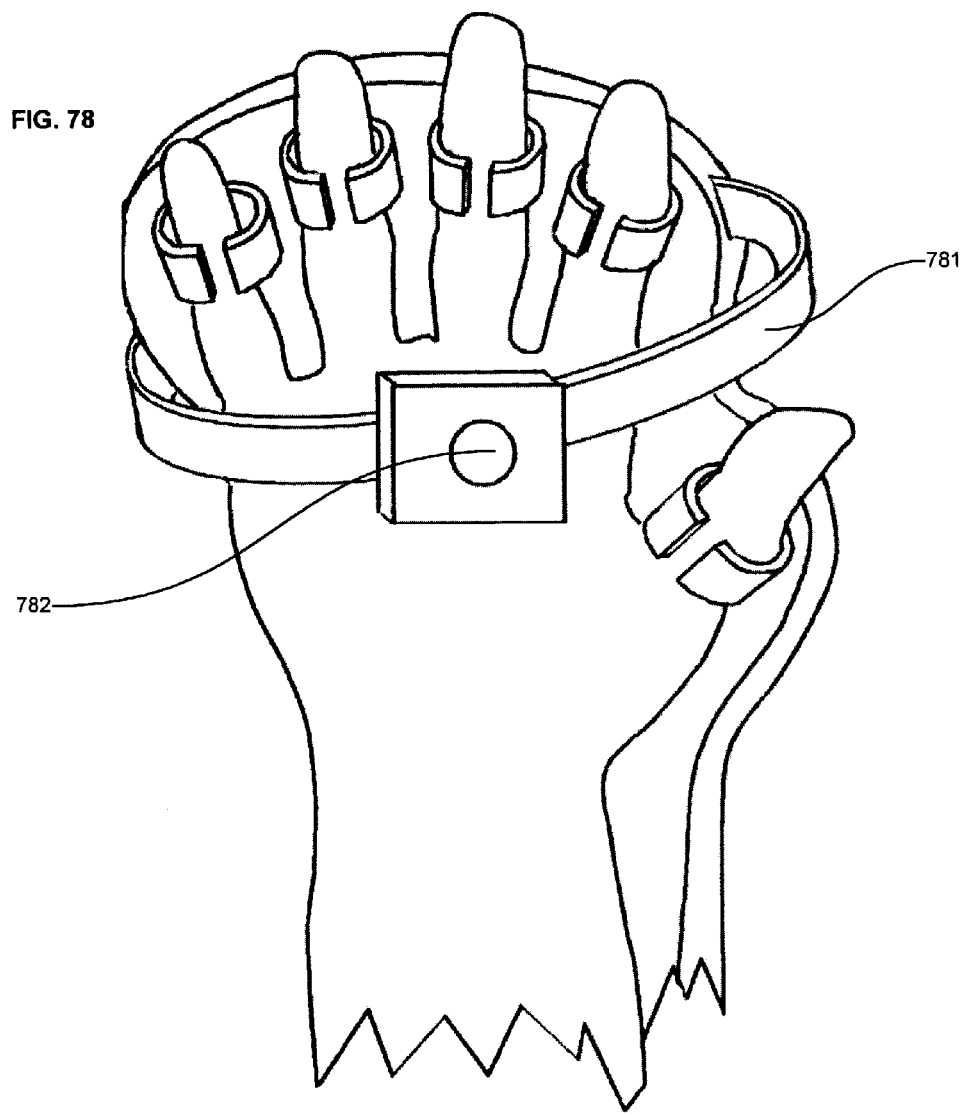

FIG. 78 depicts a perspective view of the splint after a particular attachment 781 has been added to it. In this embodiment, a trackball 782 for use as a cursor positioning device in conjunction with a computer system appears on the attachment so that the user can interact with a computer system without having to use a conventional mouse. Wireless data transmission and processing components can be included in the attachment 781, the trackball housing, or the arm attachment mechanism as in other embodiments.

Figure 79:
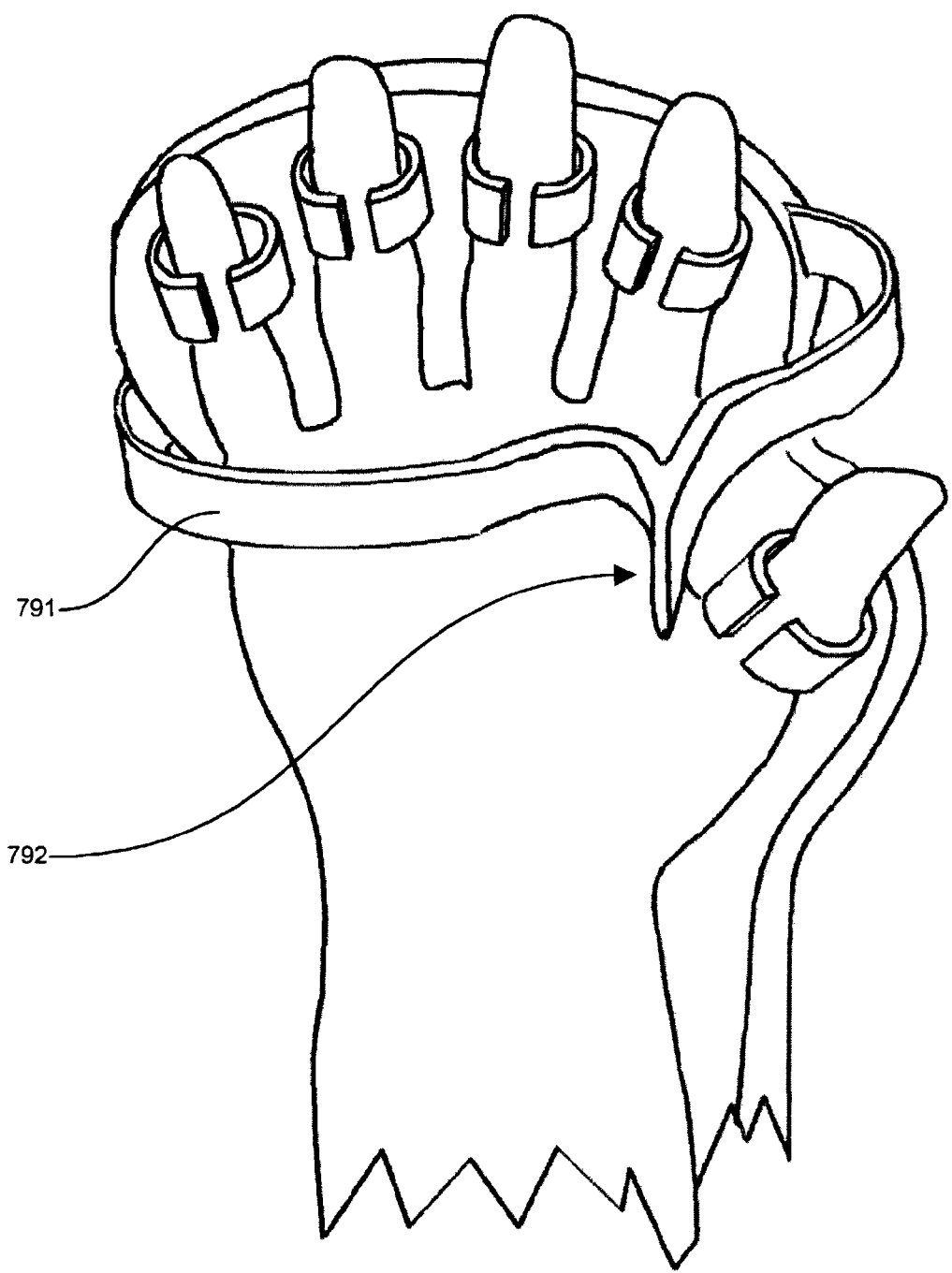

FIG. 79 depicts the same splint after a different attachment 791 has been added. This attachment 791 is shaped so as to provide a point 792 which can serve as a hands-free, wearable guitar pick. In this case, the attachment 791 can be used separately, providing a different sort of guitar pick which is easier to hold than a conventional guitar pick, since it provides a space for all four fingers to hold onto the attachment while the actual pick portion of the attachment is held between the thumb and index finger.

Figure 80:
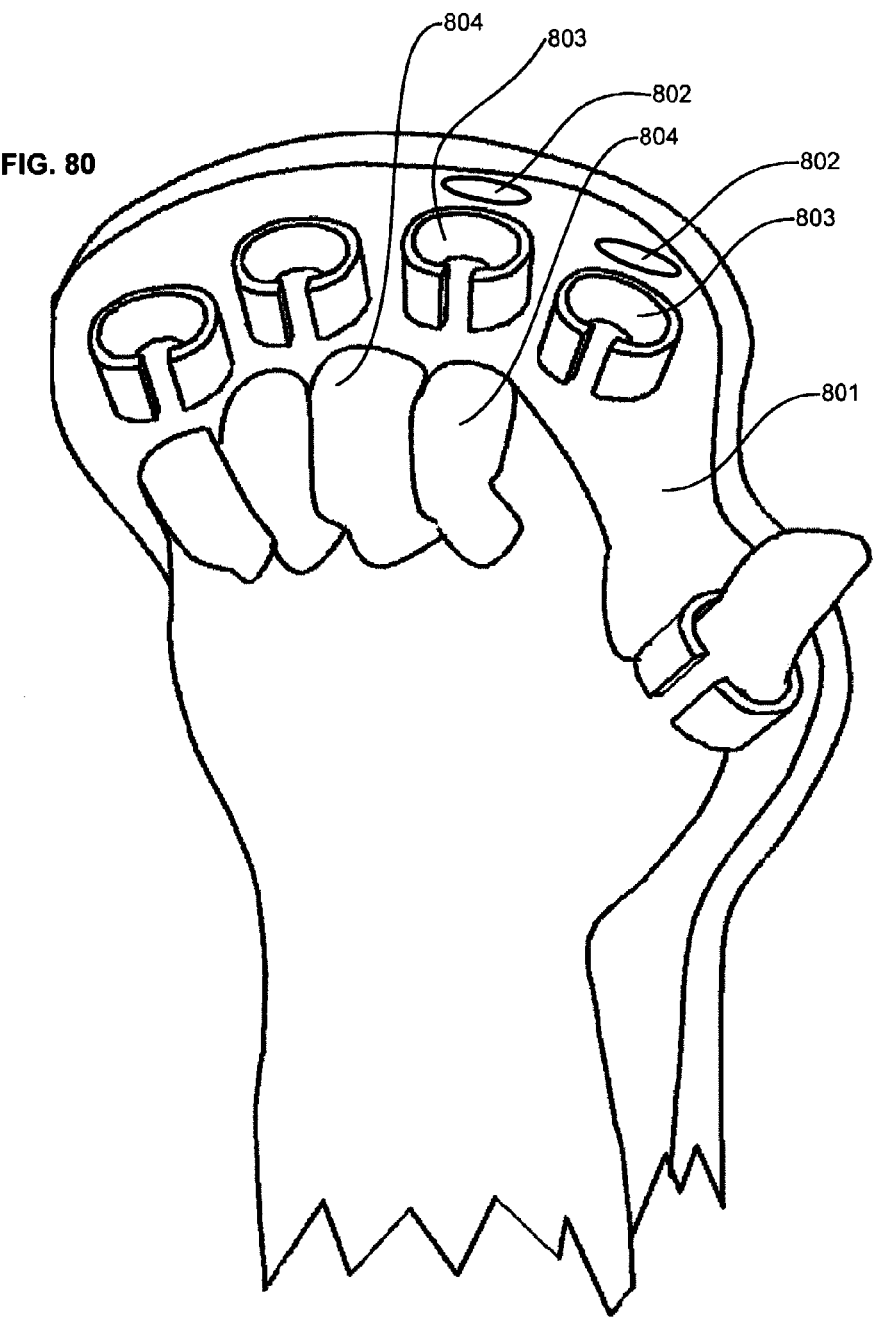

FIG. 80 depicts another alternative embodiment of the flexion-discouraging arm piece 801. This arm piece 801 includes two buttons 802 that are mounted above the open-sided rings 803 that are positioned to grasp the user's index and middle fingers 804. These buttons 802 are computer mouse-click buttons that can be pressed by extension—rather than flexion—of the user's index and/or middle fingers 804 when the unit is being worn. In this way, interaction with a computer system can actually serve a therapeutic value for CTS sufferer, since exercise of the extensor muscles counteracts overdevelopment or spasming of the flexor muscles.

FIG. 81 depicts an alternative embodiment in which the arm piece 810 includes attached open sided rings 661 and a wrist-wearable, deployable manual interface 73.

The inventor has found the disclosed CTS therapy device to be quite effective when worn for approximately one hour each day, as it appears to "retrain" the hand to stay in a more open rather than a contracted position when the hand is at rest. Such retraining would probably not occur with the use of a flexion-preventing rather than a flexion-discouraging device.

FIG. 82 depicts a novel automobile dashboard 820 according to the present invention which includes a battery charger 821, odometer 824, heater/air conditioner vents 825, and movable lids 826 which correspond individually to each of the air vents 825. Batteries 822, such as those used in the wrist-wearable device, can be seen in the battery charger 821. The dashboard has a top surface 827 and a front surface 828.

FIG. 83 depicts a color-to-number matrix according to the present invention, whereby a specific distinguishable color is assigned uniquely to each of the ten numerals in a base-10 numerical system.

FIG. 84 depicts a closer view of the odometer 824. As with conventional odometers, the depicted odometer 824 displays numerical characters that indicate elapsed mileage. Additionally, however, this odometer 824 provides a background field that is the color uniquely assigned to the displayed numeral in the color-to-number matrix of FIG. 83. Thus, in the depicted example, one of the numerals being displayed is a "0" 841. Surrounding this numeral 841 is a rectangular field 844 that is of the color white, which is the color uniquely assigned to 0 in the color-to-number matrix. Also displayed is a numeral "2" 842 which is surrounded by a background field 843 of the color violet, which is the color assigned to 2 per the color-to-number matrix. Each turning dial or drum of the odometer therefore comprises not only ten numerical digits but also ten different colored surface segments that are visible when and only when the digit surrounded thereby is also visible. Leaf indicators or a flat-panel display can alternately be used instead of the common rotating drum-style odometer.

It can be directly observed by the reader of this document that colors can be distinguished more easily and from longer distances than individual alphanumeric characters. We can generally tell what color words appearing in a sign are, even if we can't read the words. Thus, the color-to-number matrix system is ideally suited for enhancing the human and machine readability of meters and other indicators of numerical information.

FIG. 85 depicts an attachment piece 851 for use in the wrist-wearable docking station that is a digital camera being used to record the visual appearance of the odometer 824. It is likely that individual colors recorded in the resulting digital image will be distinguishable from one another even if the individual characters cannot be recognized. Moreover, these colors will, of course, appear in a known order from right to left (e.g., tenths of a mile in the far right space, followed by the unit digit directly adjacent to the left, followed by the tens digit directly adjacent to the left, etc.). In short, by providing a color field uniquely associated with each numeral, the odometer 824 itself serves as a large, real-time updated, multicolor bar-code that can be read by both humans familiar with the color-to-number matrix and machines programmed to convert light wavelengths and light phenomena (such as black, technically an absence of light) to numbers. The disclosed color-to-number matrix is but one of many possible such matrices.

The resulting digital image taken in FIG. 85 can be processed by a data processor to extract numerical values from the colors if optical character recognition fails or to verify the results obtained from OCR by comparison to the results obtained from processing the captured color sequence.

Figure 86:
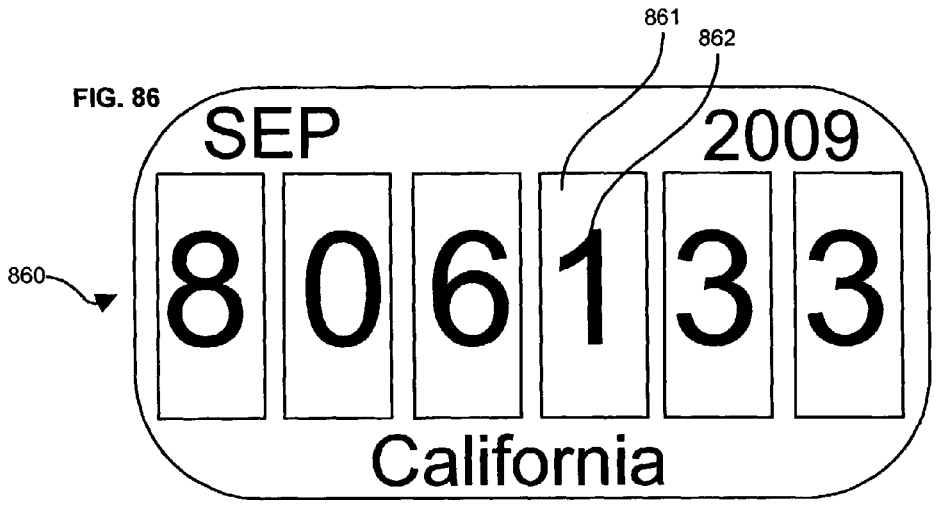
FIG. 86 depicts an anterior view of a license plate in which the color-to-number matrix is used.

FIG. 86 depicts a license plate for an automobile in which the color-to-number matrix system is alternately deployed. For example, as shown, each numeral appearing on the license plate is associated with a background color field. One such numeral 862 is a numeral "1" 862 which is surrounded by a rectangular background color field 861 that is of the color black, which color uniquely corresponds to the numeral 1 according to the color-to-number matrix. The numeral 862 and/or the color field 861 can be applied to the license plate by paint, decal, or other known method of color application.

The color-to-number matrix-enabled license plate, therefore, is in essence a very large, human- and machine-readable barcode that increases the likelihood that blurry photographs, etc., of wanted vehicles will nonetheless result in accurate identification of the vehicle.

Figure 87:
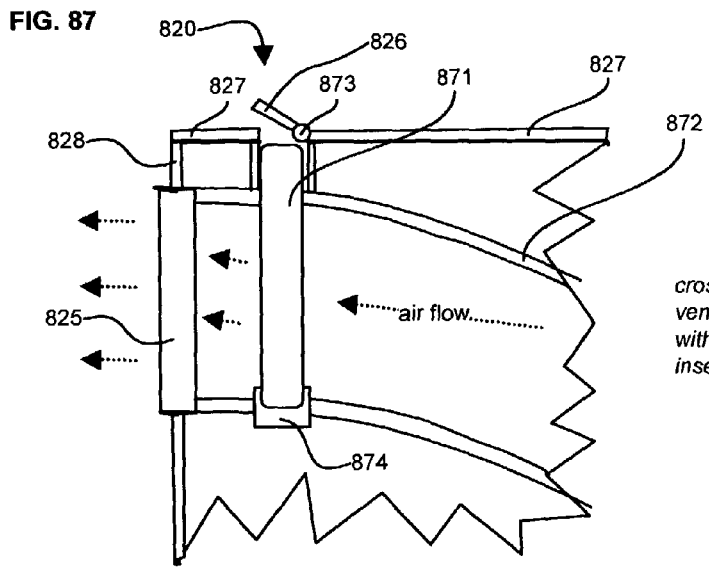
FIG. 87 depicts a cross-sectional view of the dashboard in which can be seen an air vent, air duct, air filter, and lid movably mounted on the top of the dashboard covering the air filter chamber.

FIG. 87 depicts a cross-sectional view of the dashboard 820 shown in FIG. 82. In this view, the top surface 827 and the front surface 828 of the dashboard 820 can be seen, as can one of the vents 825 and the movable lid 826 that is movably coupled to the top surface 827 of the dashboard 820 by way of a hinge 873. As can be seen, a filter 871 resides in a filter chamber 874 that intersects the air duct 872 through which air is conducted toward the vent 825 on its way into the passenger cabin of the automobile. This filter 871 can be accessed, removed, and replaced by a passenger in the passenger cabin by opening the lid 826.

Figure 88:
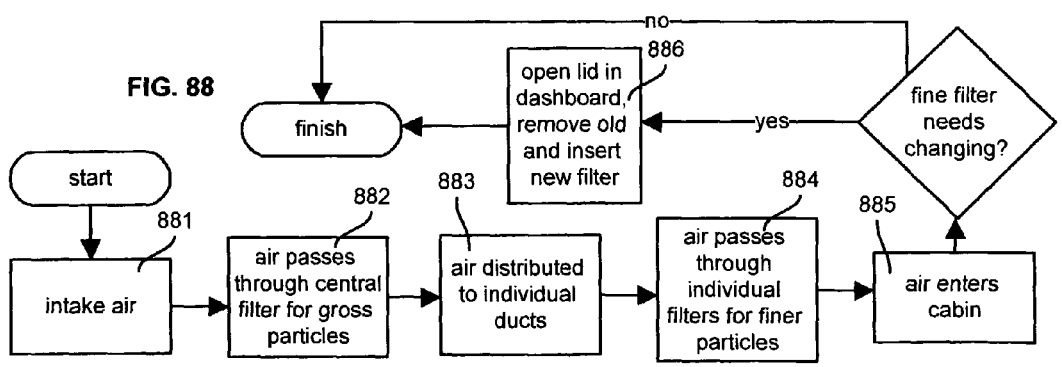
FIG. 88 depicts a flowchart illustrating the process by which the dashboard is used in a cabin air filtration system, wherein gross particles are filtered and held by a central air filter and fine particles are captured by dashboard-accessed individual filters such as that depicted in FIG. 87.

FIG. 88 depicts a flowchart illustrating process by which the disclosed dashboard interacts with a larger "distributed filtration" air purification system. Air is taken into the automobile air conditioner/heater by conventional means 881 and passes through a single, central air filter 882 that is a high-capacity, gross particle filter only. Such a high-capacity filter typically requires less common replacement than filters of finer particles. Air is then passed into the individual ducts serving the individual vents which open into the passenger cabin 883. Before reaching these vents, air passes through the individual filters, such as the filter 871 depicted in FIG. 87 that filter the air headed toward a particular vent 884. After this second filtration, air then enters the passenger cabin 885. The latter filter 871 is a HEPA filter suited for removing very fine particulate matter from the air. As such, this filter 871 will typically have a lower holding capacity and therefore will require relatively frequent replacement, but, by virtue of the dashboard accessible design, can be replaced from the passenger cabin 886.

Licensing information may be obtained at www.epoet.com or www.wearablecomputing.com.

What is claimed is:

1. A physical therapy device comprising:
   a splint member, said splint member being selected from the group consisting of (i) an inflatable splint and (ii) a non-inflatable splint;
   at least one grasping member suitable for grasping a human finger, said grasping member being mounted upon said splint member and configured to release said finger when said finger is flexed; and
   an attachment mechanism suitable for attaching said splint member to the forearm of a human.

2. The device in claim 1 wherein said at least one grasping member is configured to release said finger when sufficient pressure is applied through flexion of said finger.

3. The device in claim 1 wherein the device comprises a plurality of grasping members.

4. The device in claim 3 wherein said grasping members are spaced apart from each other so as to be suitable for retraining said hand and fingers to remain in an open position when at rest.

5. The device in claim 1 wherein said at least one grasping member is an open-sided ring.

6. The device in claim 1 wherein said grasping member comprises a flexible material and the flexibility of said flexible material allows said release of said finger when said finger is flexed.

7. The device in claim 1 wherein said attachment mechanism is removable.

8. The device in claim 1 wherein said attachment mechanism is spaced apart from said at least one grasping member so as to allow said at least one grasping member to grasp said human finger without said device making contact with the palm of the user's hand.

9. The device in claim 4 wherein the device comprises five grasping members.

10. The device in claim 1 wherein said grasping member is selected from the group consisting of (i) a grasping member that is movably coupled to said splint and (ii) a grasping member that is immovably coupled to said splint.

11. The device in claim 1 wherein said at least one grasping member is positioned on said splint member such that a finger can leave the grasp of said grasping member through a space that is substantially opposite the splint member.

12. The device in claim 11 wherein said at least one grasping member is flexible.

13. A physical therapy device comprising:
    a splint member, said splint member being selected from the group consisting of (i) a splint comprising an electronic device and (ii) a non-electronic splint;
    an attachment mechanism suitable for attaching said splint member to a user; and
    at least one grasping member suitable for grasping a human digit, said grasping member being mounted upon said splint member and configured to allow said digit to escape from said grasping member when said digit is flexed with sufficient force, thereby discouraging without preventing flexion of said digit, wherein:
      said at least one grasping member is selected from the group consisting of (i) a grasping member that is movably coupled to said splint and (ii) a grasping member that is immovably coupled to said splint.

14. The physical therapy device in claim 13 wherein said digit is a finger.

15. The physical therapy device in claim 13 wherein said device comprises a plurality of grasping members.

16. The physical therapy device in claim 15 wherein said grasping members are spaced apart from each other so that, when said device is worn on a hand of said user, the fingers of the hand and thumb are held in an open position.

17. A physical therapy device comprising:
    a splint member, said splint member being selected from the group consisting of (i) a splint comprising a prosthetic finger and (ii) a non-prosthetic splint;
    a first attachment mechanism suitable for attaching said splint member to a user so that said splint member does not contact the palm of the user's hand; and
    a second attachment mechanism suitable for attaching to the user's finger, said second attachment mechanism being flexible and being mounted upon said splint member, wherein said second attachment mechanism is configured to fit partially around said human finger but to allow flexion of said finger when sufficient pressure is applied.

18. The device in claim 17 wherein the device comprises five grasping members.

19. The device in claim 17 wherein said at least one grasping member is constructed to allow said finger to escape the grasp of said at least one grasping member by moving through a space that is substantially opposite the splint member.

20. The device in claim 19 wherein the flexibility of said at least one grasping member allows said finger to escape through said space.

* * * * *